(12) United States Patent
Aposhian et al.

(10) Patent No.: US 10,609,861 B2
(45) Date of Patent: *Apr. 7, 2020

(54) SOD HARVESTER HAVING AUXILIARY STACKING CONVEYOR

(71) Applicant: FireFly Automatix, Inc., North Salt Lake, UT (US)

(72) Inventors: Steven R. Aposhian, Farmington, UT (US); Eric E. Aston, Farmington, UT (US); William M. Decker, Salt Lake City, UT (US); Samuel H. Drake, Cottonwood Heights, UT (US); Daniel A. Aposhian, West Valley City, UT (US); Matthew G. Aposhian, Kaysville, UT (US)

(73) Assignee: FireFly Automatix, Inc., North Salt Lake, UT (US)

( * ) Notice: Subject to any disclaimer, the term of this patent is extended or adjusted under 35 U.S.C. 154(b) by 81 days.

This patent is subject to a terminal disclaimer.

(21) Appl. No.: 16/006,723

(22) Filed: Jun. 12, 2018

(65) Prior Publication Data

US 2018/0288937 A1    Oct. 11, 2018

Related U.S. Application Data

(63) Continuation of application No. 14/815,514, filed on Jul. 31, 2015, now Pat. No. 10,111,372.

(51) Int. Cl.
*A01D 19/00* (2006.01)
*A01G 20/15* (2018.01)
*B65G 57/32* (2006.01)

(52) U.S. Cl.
CPC ............. *A01D 19/00* (2013.01); *A01G 20/15* (2018.02); *B65G 57/32* (2013.01); *B65G 2201/045* (2013.01)

(58) Field of Classification Search
CPC ........ A01D 19/00; A01G 20/00; A01G 20/15; B65G 57/32; B65G 2201/045
See application file for complete search history.

(56) References Cited

U.S. PATENT DOCUMENTS

| | | |
|---|---|---|
| 3,664,432 A | 5/1972 | Nunes, Jr. |
| 3,776,314 A | 12/1973 | Nunes, Jr. |
| 5,697,753 A | 12/1997 | Aurora et al. |
| 7,641,437 B1 | 1/2010 | Tvetene et al. |
| 8,622,199 B2 | 1/2014 | Windfeld et al. |

*Primary Examiner* — Jessica H Lutz
(74) *Attorney, Agent, or Firm* — Kirton McConkie; Brian Tucker

(57) ABSTRACT

A sod harvester can include an auxiliary stacking conveyor for stacking or folding slabs of sod on a conveyor prior to the stacked/folded slabs being removed from a stacking conveyor by a stacking head. The auxiliary stacking conveyor can be configured to receive a leading slab of sod and then stack the leading slab on top of a trailing slab while the trailing slab is being advanced along a conveyor. The auxiliary stacking conveyor can also be configured to partially receive a slab of sod and then reverse direction to cause the slab to be folded backwards on top of itself while being advanced along a conveyor. Different configurations can be employed to cause slabs to be selectively positioned on an auxiliary stacking conveyor.

20 Claims, 27 Drawing Sheets

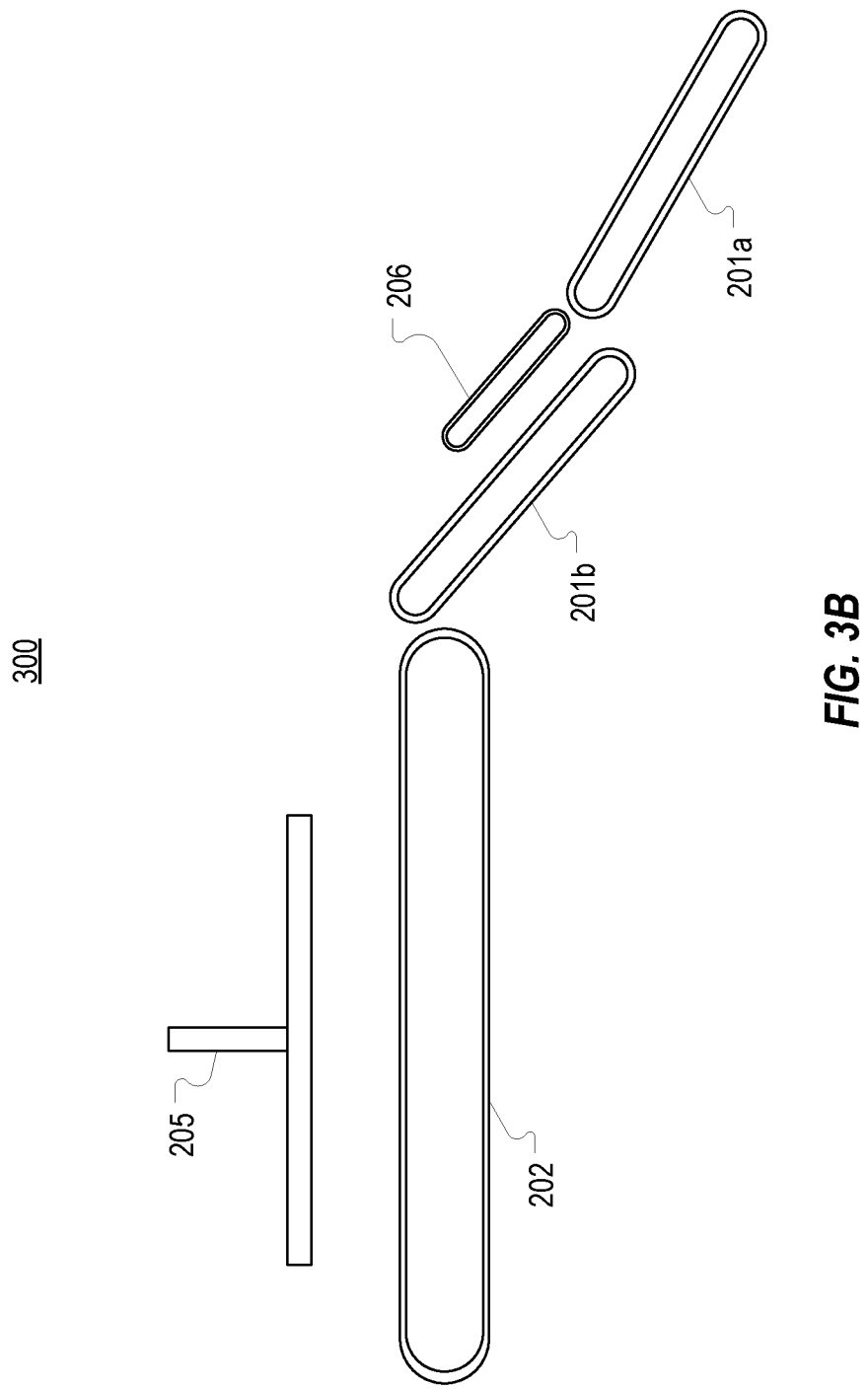

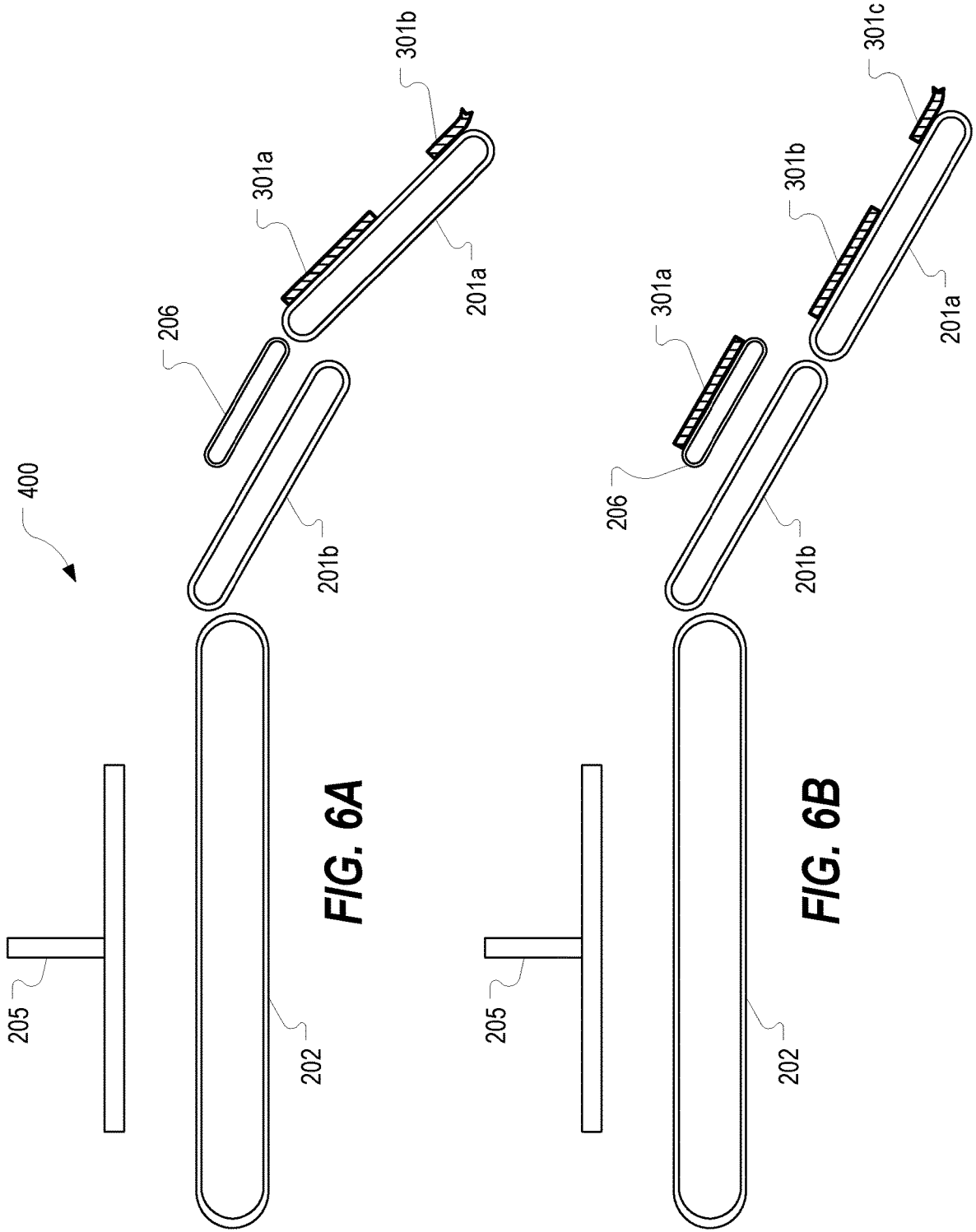

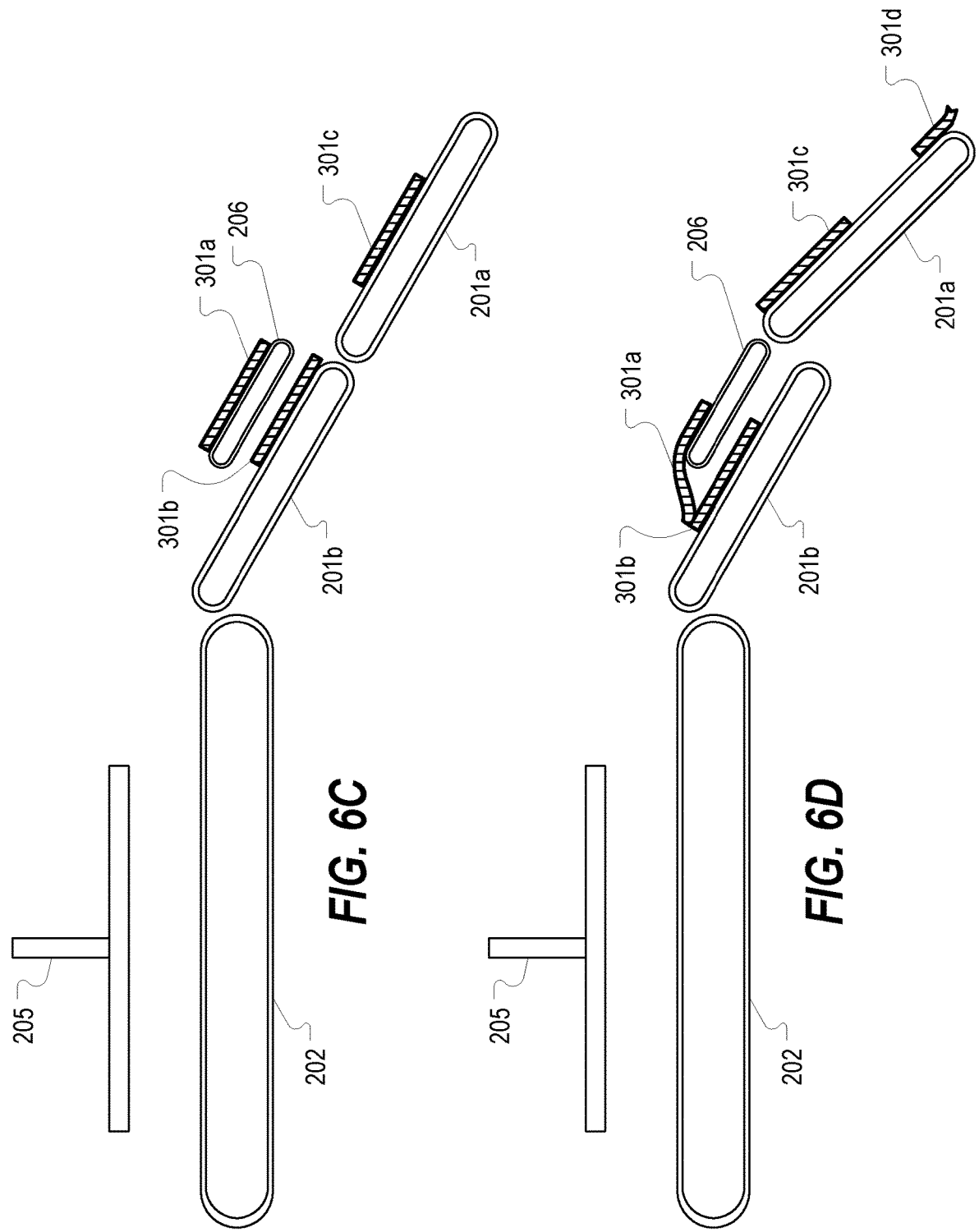

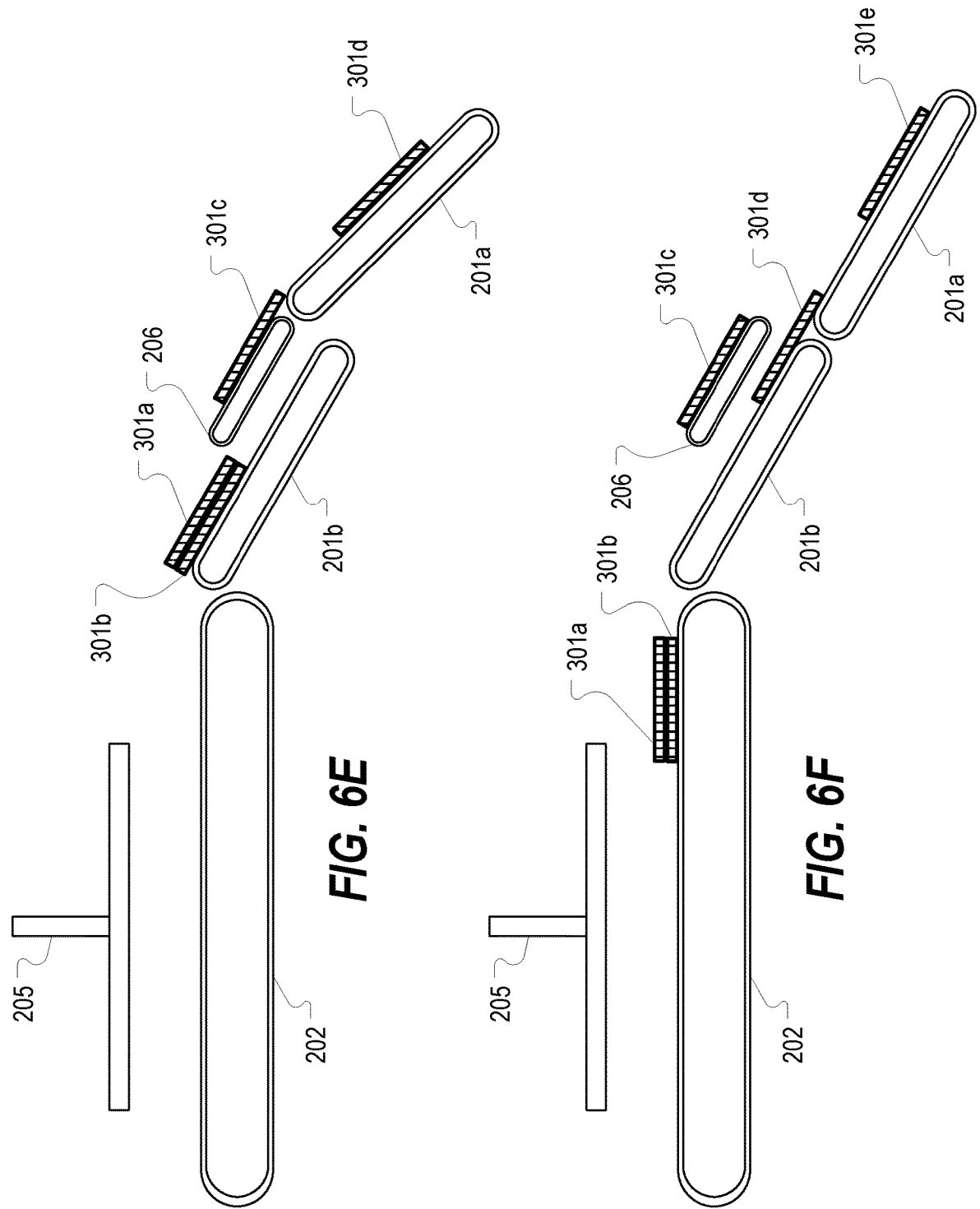

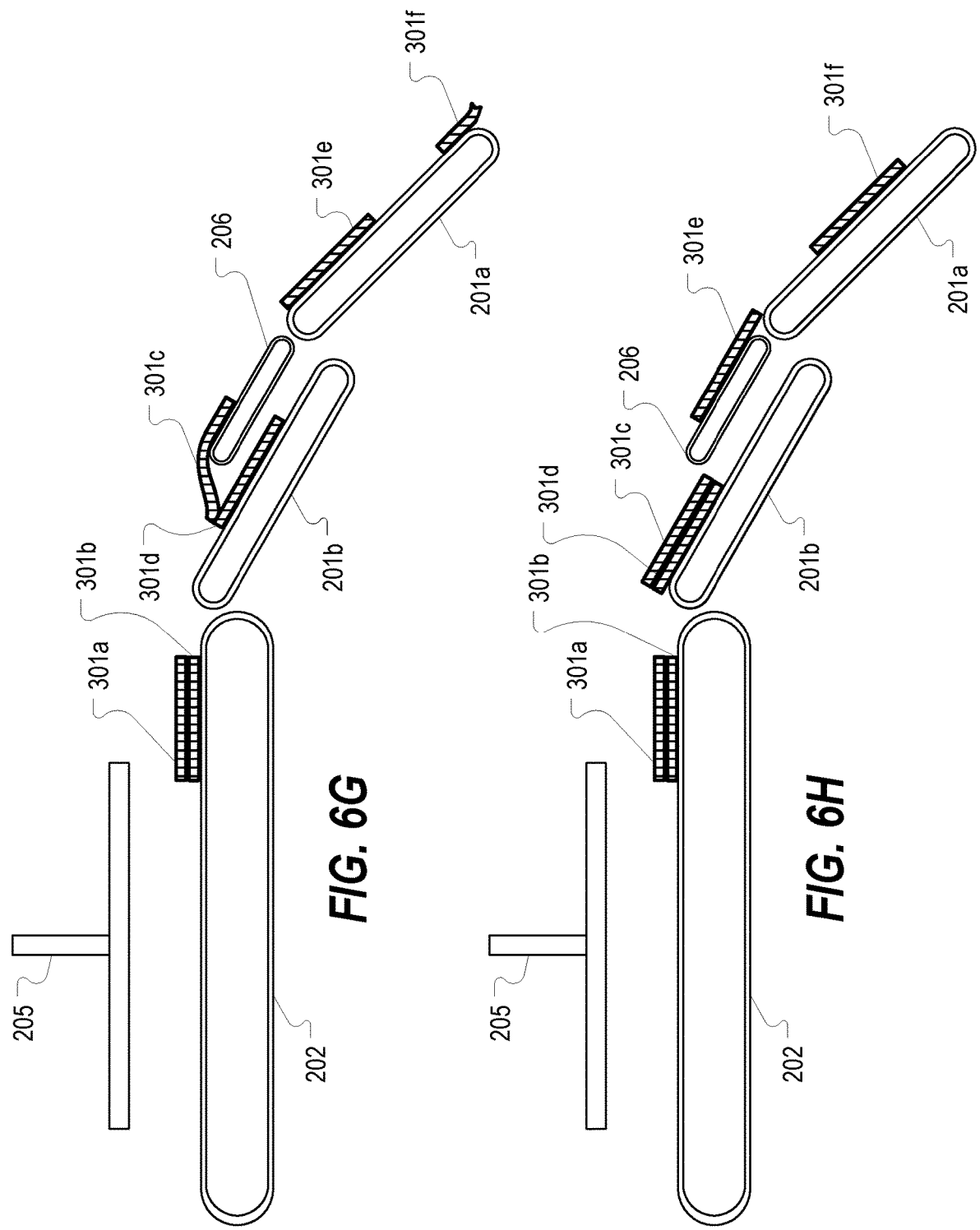

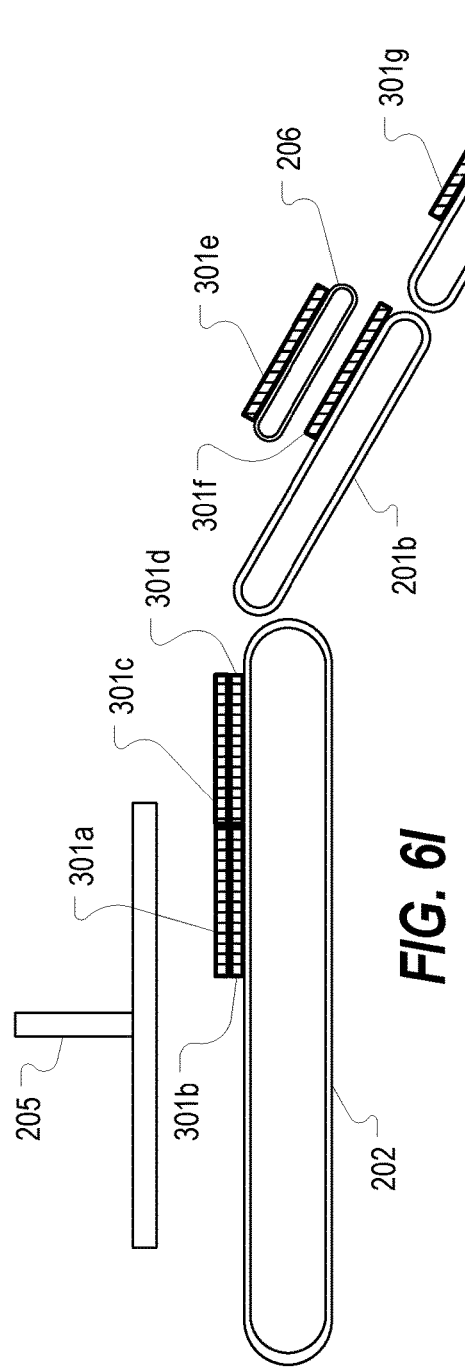
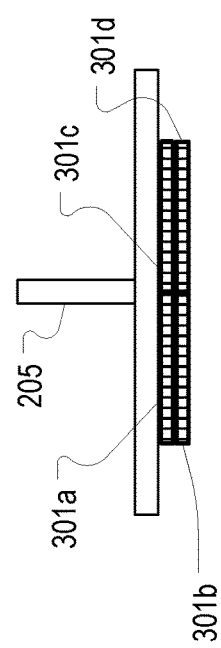
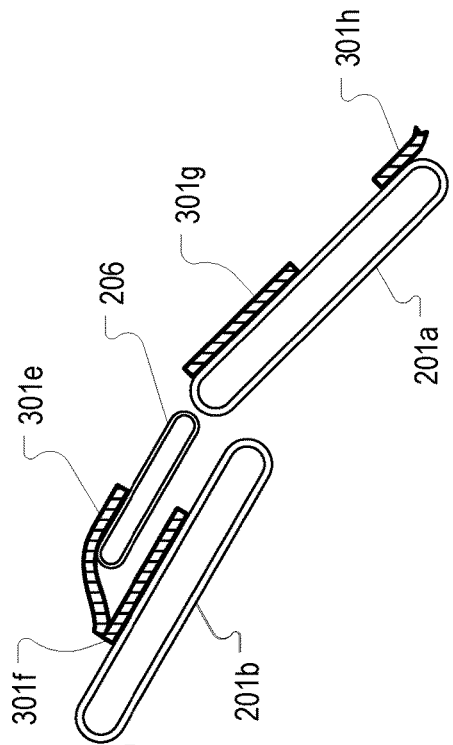
FIG. 6I
FIG. 6J

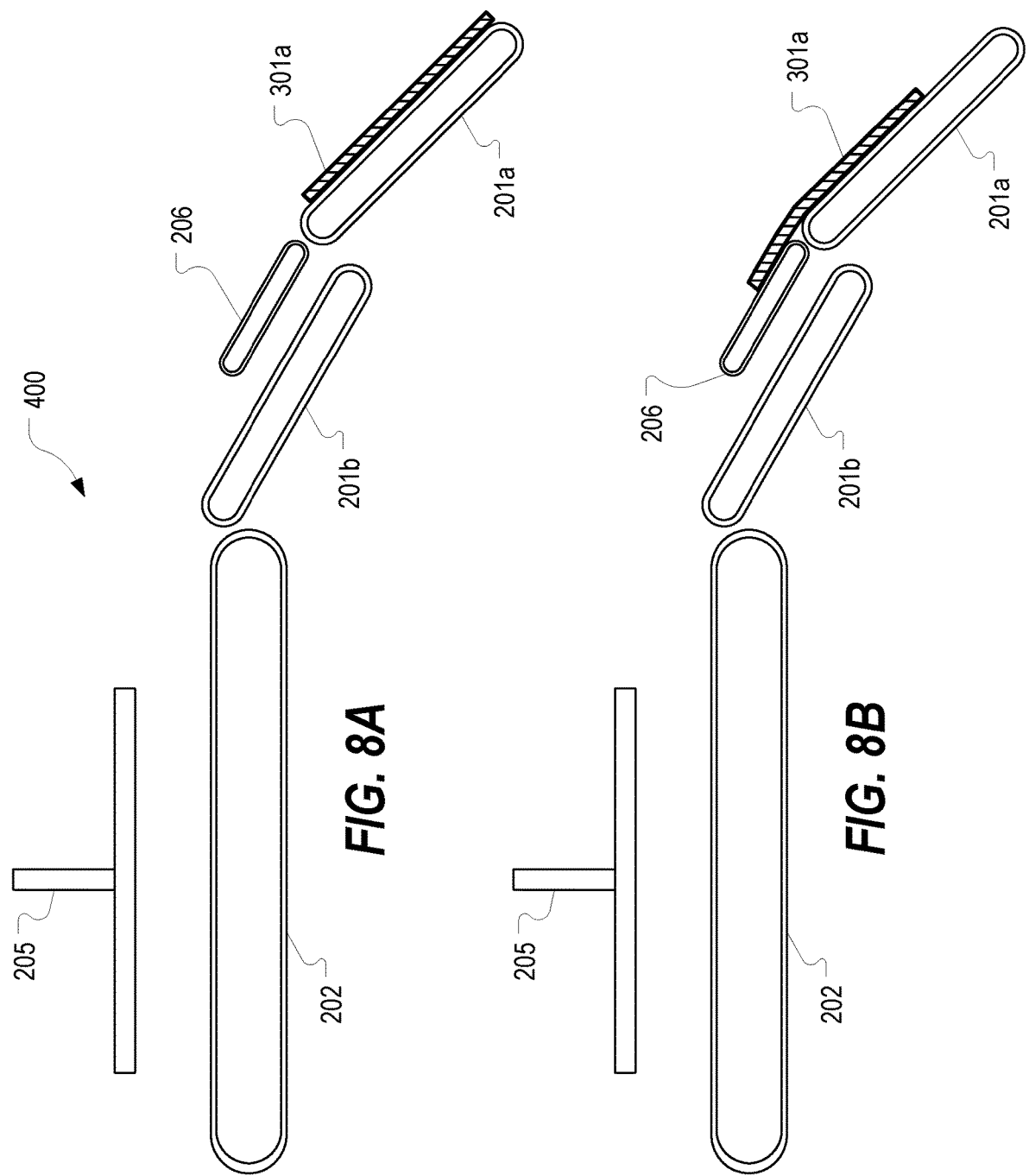

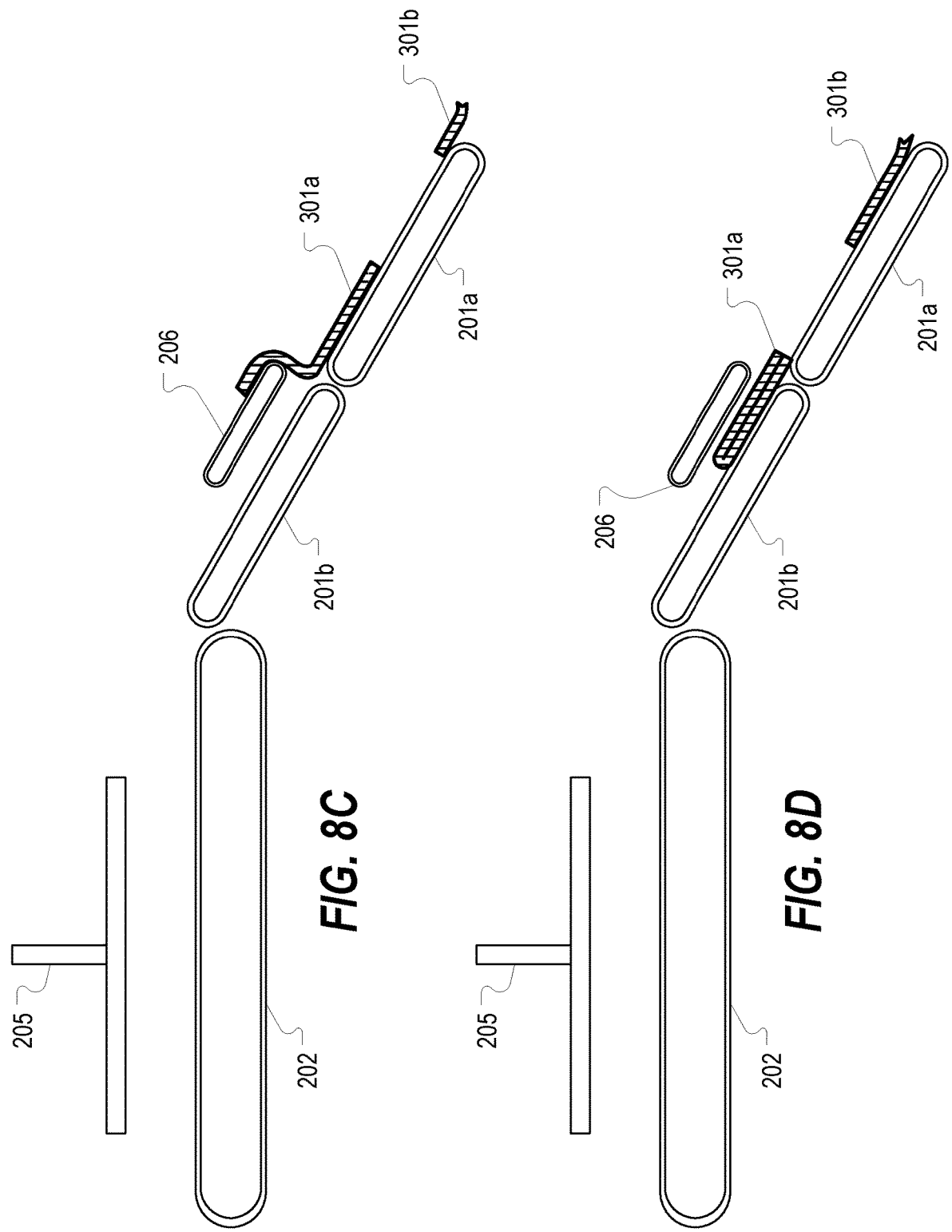

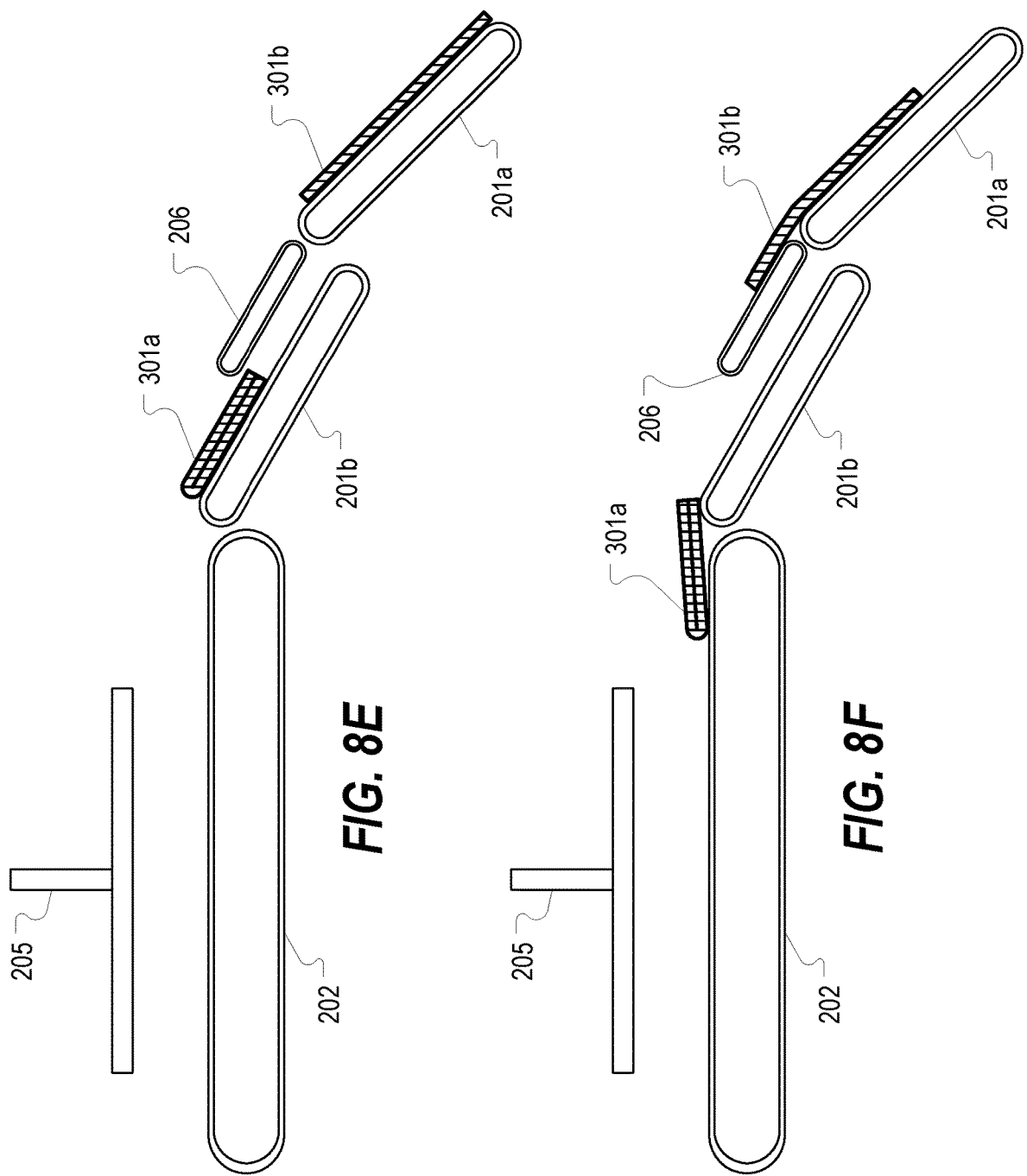

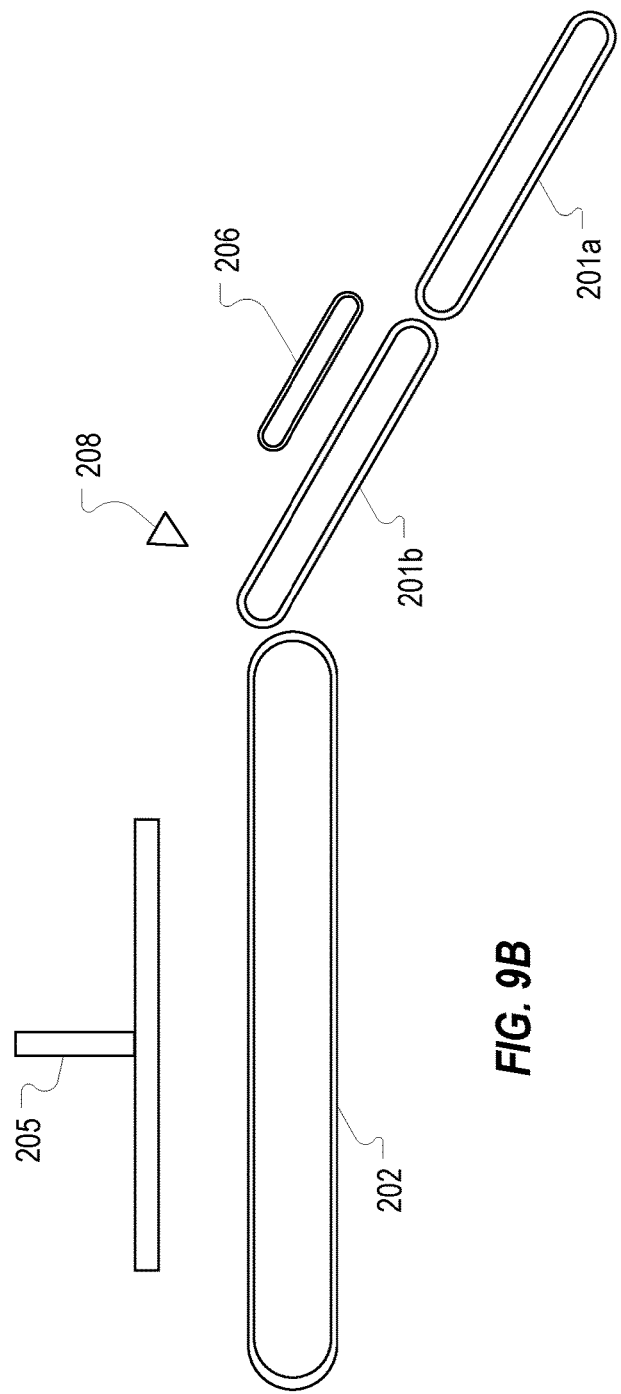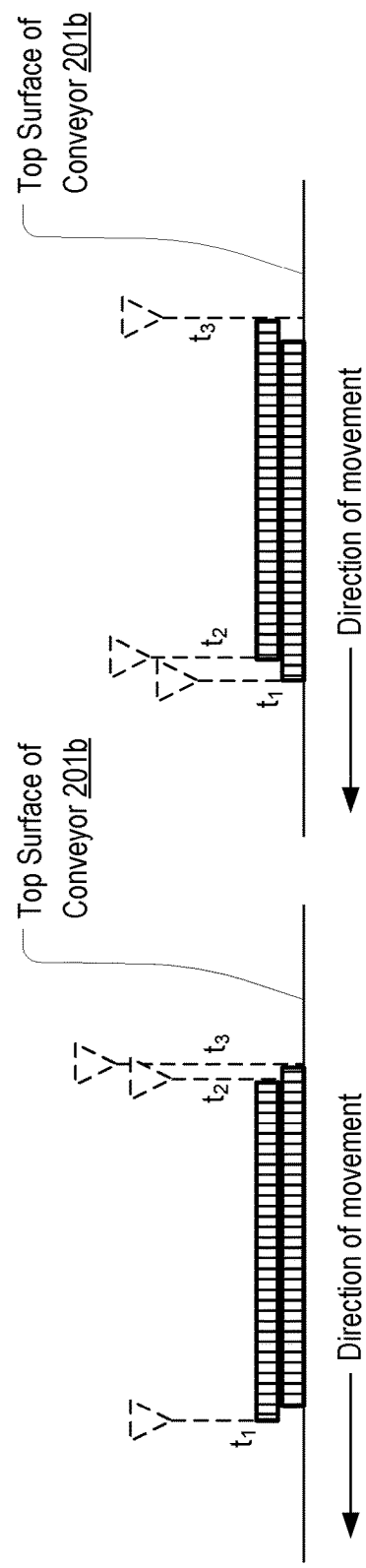
FIG. 9B
FIG. 9C
FIG. 9D

SOD HARVESTER HAVING AUXILIARY STACKING CONVEYOR

CROSS-REFERENCE TO RELATED APPLICATIONS

This application is a continuation of U.S. patent application Ser. No. 14/815,514 which was filed on Jul. 31, 2015.

U.S. patent application Ser. No. 13/851,402 ("the '402 application") discloses techniques for accumulating multiple slabs of sod at a front end of a stacking conveyor prior to advancing the stacking conveyor to a position where the accumulated slabs are picked up. A sod harvester configured in accordance with the present invention could also be configured to perform the accumulation techniques described in the '402 application. Accordingly, the '402 application is incorporated herein by reference.

U.S. patent application Ser. No. 14/303,316 ("the '316 application") discloses various techniques for controlling the movement of the stacking conveyor and/or stacking head to maximize the rate at which the stacking head can remove sod from the stacking conveyor. A sod harvester configured in accordance with the present invention could also be configured to perform any of the techniques disclosed in the '316 application. Accordingly, the '316 application is incorporated herein by reference.

BACKGROUND

Turf grass (sod) is a living organism that must be handled properly to ensure its survival when it is removed from one location and transplanted to another. Sod is generally harvested using large machinery that cuts slabs of sod from the soil and stacks them on pallets.

FIG. 1 illustrates a portion of a sod harvesting machine 100 that includes a typical cutting head, conveyor system, and stacking system. The cutting head of FIG. 1 includes a chop mechanism 110, an oscillating blade 103, and a roller 104. Chop mechanism 110 is configured to periodically descend into the sod 151 to make vertical cuts defining an initial width/length of the slabs. Oscillating blade 103 oscillates back and forth underneath the sod to sever the slab from the underlying soil 150. Roller 103 applies pressure to the sod as it is cut to facilitate the cutting of clean slabs. Slabs cut by the cutting head are routed to conveyor 101 which lifts the slabs up to stacking conveyor 102 from which they are removed by a stacking head 105 for stacking on a pallet. Typically, the pallet is positioned adjacent to the stacking conveyor so that the stacking head can move back and forth between the stacking conveyor and pallet when stacking.

It is generally desirable to harvest sod as quickly as possible. However, various factors limit the speed at which sod can be harvested primary of which is the rate at which sod can be stacked on a pallet. For example, the ground speed of the sod harvester directly defines the rate at which sod is harvested. However, even if a sod harvester is capable of cutting sod from the ground at a faster rate, the sod harvester may still be limited by the rate at which the sod can be removed from the stacking conveyor and stacked on the pallet. In other words, the ground speed of sod harvester 100 is limited by the rate at which the stacking head 105 can remove sod from stacking conveyor 102.

Even if a stacking head can be operated quickly to increase the rate of sod harvesting, the increased rate does not necessarily yield a net gain in efficiency. For example, operating the stacking head at high rates can require substantial additional amounts of energy leading to increased fuel costs. These increased fuel costs may offset any gains resulting from the increased rate of sod harvesting. Also, operating at high rates increases the forces on the components of the stacking head leading to more frequent and costly repairs and corresponding downtime. Accordingly, the stacking head oftentimes forms the bottleneck during the sod harvesting process.

BRIEF SUMMARY

The present invention extends to a sod harvester that includes an auxiliary stacking conveyor for stacking or folding slabs of sod prior to the stacked/folded slabs being removed from a stacking conveyor by the stacking head. In this way, the stacking head can remove multiple layers of sod during a single stacking operation. By removing multiple layers of sod, the stacking head can move less frequently while still stacking sod at the same rate. This results in reduced fuel consumption and wear and tear on the stacking head while still enabling high rates of harvesting.

In some embodiments, the auxiliary stacking conveyor can be configured to receive a leading slab of sod and then stack the leading slab on top of a trailing slab while the trailing slab is being advanced along an inclined conveyor. In other embodiments, the auxiliary stacking conveyor can be configured to partially receive a slab of sod and then reverse direction to cause the slab to be folded backwards on top of itself while being advanced along an inclined conveyor. An inclined conveyor can be configured in various ways to cause slabs to be selectively advanced onto the auxiliary stacking conveyor including, for example, by pivoting the inclined conveyor, by employing a pivoting gate, or by employing an auxiliary stacking head.

After slabs of sod have been stacked or folded on the conveyor, the stacked slabs can be advanced onto the stacking conveyor to a position where the stacking head can remove the stacked or folded slabs for final stacking on a pallet. In some embodiments, stacked or folded slabs can be accumulated on the stacking conveyor prior to being advanced to the position where they will be removed from the stacking conveyor.

In one embodiment, the present invention is implemented as a sod harvester comprising a cutting head for cutting slabs of sod from the ground, a stacking conveyor, a stacking head positioned overtop the stacking conveyor, a first inclined conveyor for receiving the slabs from the cutting head, a second inclined conveyor positioned between the first inclined conveyor and the stacking conveyor, and an auxiliary stacking conveyor positioned overtop the second inclined conveyor. The auxiliary stacking conveyor is configured to form stacks of slabs on the second inclined conveyor prior to the stacks of slabs being advanced to the stacking conveyor. The stacking head is configured to remove the stacks of slabs from the stacking conveyor.

In another embodiment, the present invention is implemented as a sod harvester comprising a cutting head for cutting slabs of sod from the ground, a stacking conveyor, a stacking head positioned overtop the stacking conveyor, one or more inclined conveyors for advancing the slabs of sod from the cutting head to the stacking conveyor, an auxiliary stacking conveyor positioned overtop the one or more inclined conveyors, and an auxiliary stacking head configured to selectively remove the slabs from the one or more inclined conveyors and place the slabs on the auxiliary stacking conveyor. The auxiliary stacking conveyor is configured to form stacks of slabs on the one or more inclined conveyors prior to the stacks of slabs being advanced to the stacking conveyor. The stacking head is configured to remove the stacks of slabs from the stacking conveyor.

In another embodiment, the present invention is implemented as a method for harvesting sod. Slabs of sod are cut from the ground. The slabs are advanced along one or more inclined conveyors that carry the slabs from the ground to a stacking conveyor. Prior to advancing the slabs onto the stacking conveyor, stacks of two or more slabs are formed on the one or more inclined conveyors. The stacks of slabs are advanced onto the stacking conveyor. The stacks of slabs are then removed from the stacking conveyor.

This summary is provided to introduce a selection of concepts in a simplified form that are further described below in the Detailed Description. This Summary is not intended to identify key features or essential features of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIGS. 3A and 3B illustrate an embodiment of a sod harvester where a second inclined conveyor and the auxiliary stacking conveyor pivot between a raised and lowered position to selectively advance slabs of sod from the first conveyor onto either the auxiliary stacking conveyor or the second inclined conveyor;

FIGS. 6A-6J illustrate a sequence of views of the sod harvester of FIGS. 4A and 4B depicting how the auxiliary stacking conveyor stacks slabs of sod on an inclined conveyor prior to the stacked slabs being advanced onto the stacking conveyor;

FIGS. 8A-8F illustrate a sequence of views of the sod harvester of FIGS. 4A and 4B when the auxiliary stacking conveyor is configured to fold slabs of sod on the inclined conveyor;

FIGS. 9A and 9B each illustrates the sod harvester of FIG. 2 along with a sensor that could be employed to implement proper timing of the auxiliary stacking conveyor; and FIGS. 9C and 9D represent how the sensor shown in FIG. 9B can detect a misalignment in stacked or folded slabs.

DETAILED DESCRIPTION

Figure 1:
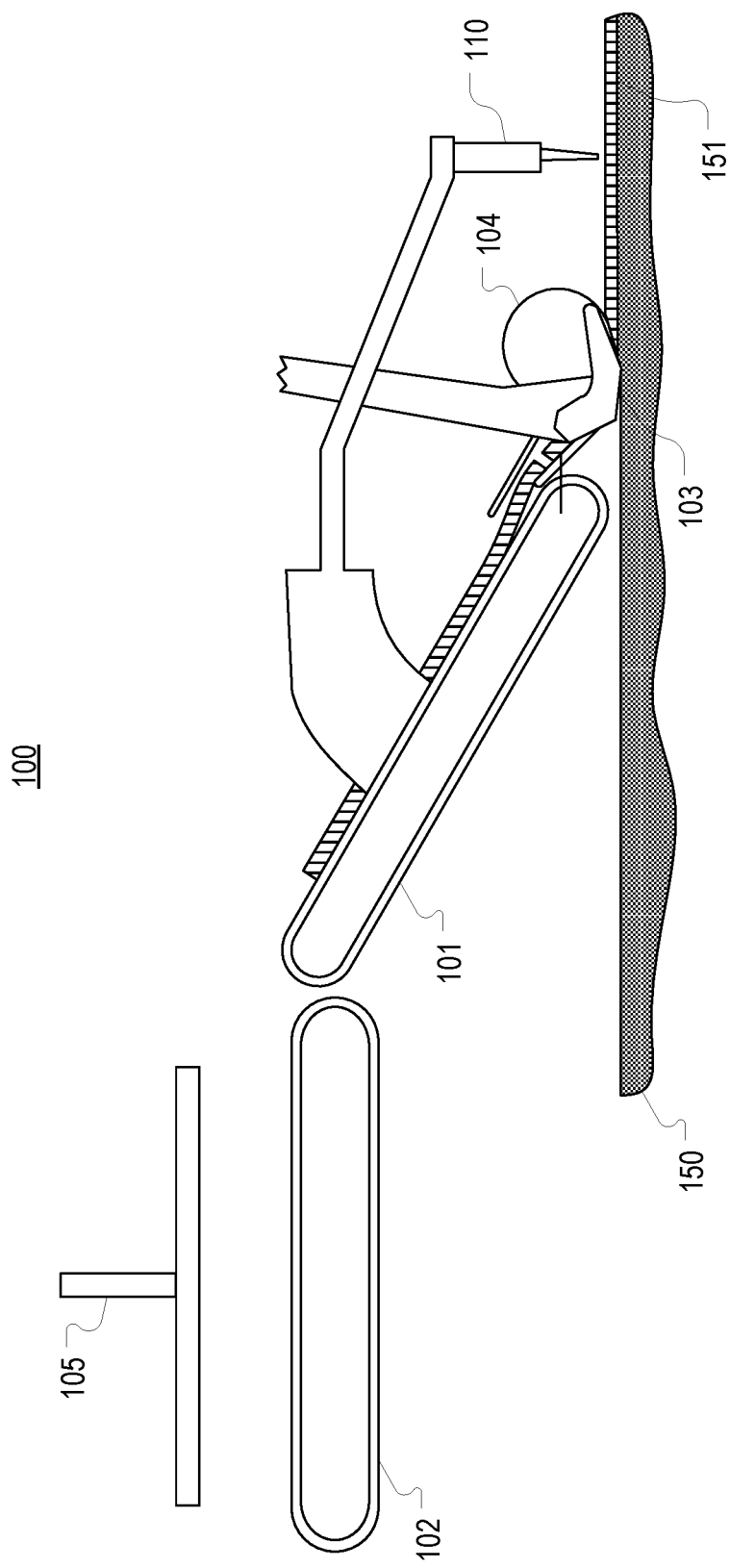
FIG. 1 illustrates an example of various components of a typical sod harvesting machine.
Figure 2:
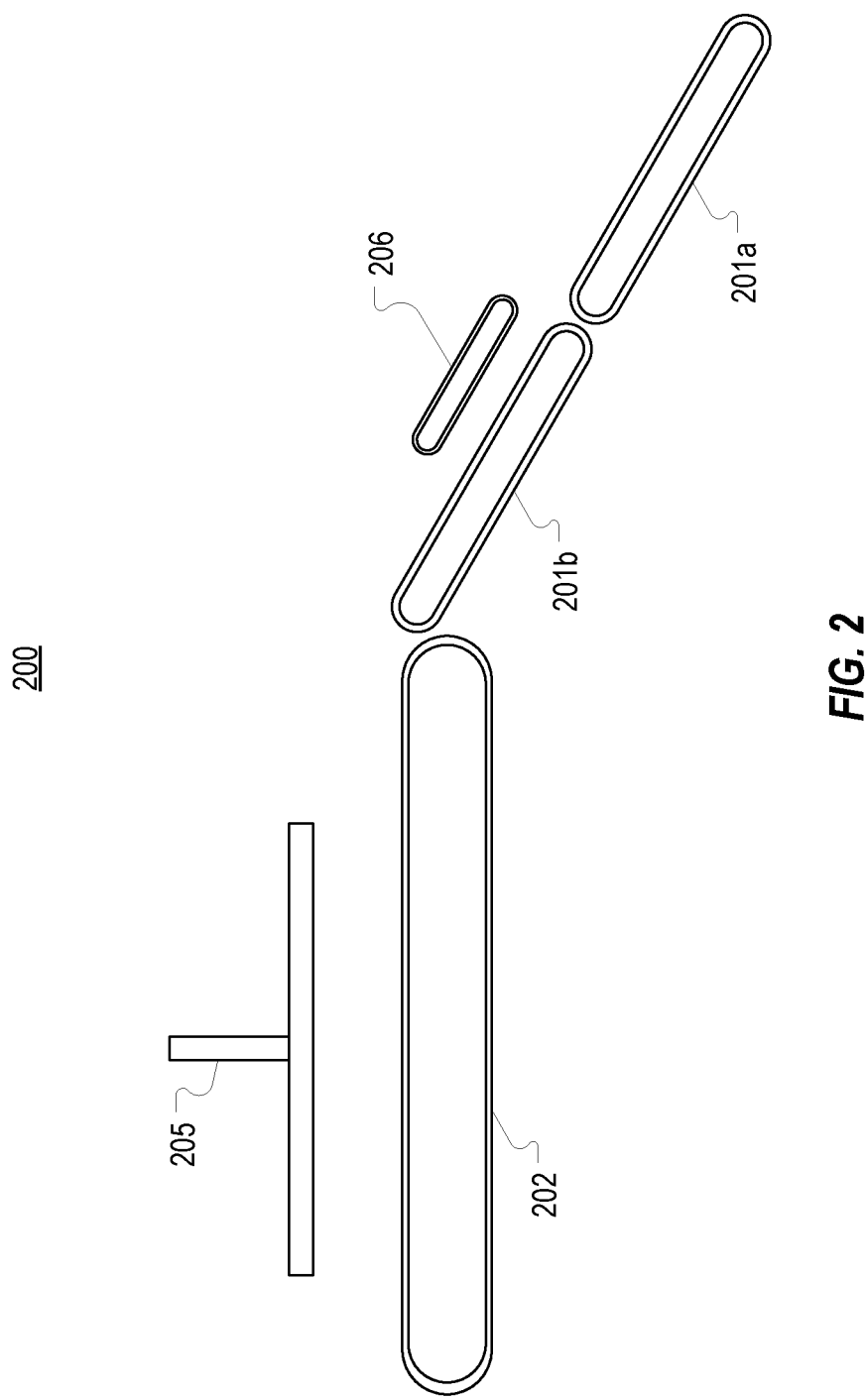
FIG. 2 illustrates an example of a sod harvester that includes an auxiliary stacking conveyor that is positioned overtop an inclined conveyor.

FIG. 2 illustrates components of a sod harvester 200 that is configured in accordance with embodiments of the present invention. Although not shown, sod harvester 200 would include a cutting head for removing slabs of sod from the ground and delivering the slabs to a first inclined conveyor 201a. Sod harvester 200 also includes a second inclined conveyor 201b that is positioned between first inclined conveyor 201a and stacking conveyor 202.

First and second inclined conveyors 201a, 201b can preferably be operated at a speed that is slightly faster than ground speed so that a gap exists between each slab of sod as the slabs travel along the inclined conveyors. A stacking head 205 can be employed to remove the slabs of sod from stacking conveyor 202 and to stack the slabs on a pallet. Typically, the pallet can be positioned alongside stacking conveyor 202; however, the position of the pallet is not essential to the invention. Examples of stacking head 205 and its operation are disclosed in the '316 application as well as in U.S. Pat. No. 9,022,720 titled "Electrically Operated Turf Stacking System For Sod Harvesting Machine" which is incorporated herein by reference. The present invention, however, should not be limited to any particular configuration of stacking head 205 as long as stacking head 205 is configured to pick up stacked or folded slabs of sod as will be further described below.

In accordance with embodiments of the present invention, sod harvester 200 also includes an auxiliary stacking conveyor 206 which is used to stack or fold slabs of sod on inclined conveyor 201b (and, in some cases, at least partially on inclined conveyor 201a). Auxiliary stacking conveyor 206 is positioned above second inclined conveyor 201b and is configured to receive slabs of sod to be stacked or folded. A sod harvester that includes an auxiliary stacking conveyor can be configured in various different ways to form stacked or folded slabs of sod on second inclined conveyor 201b.

Figure 3A:
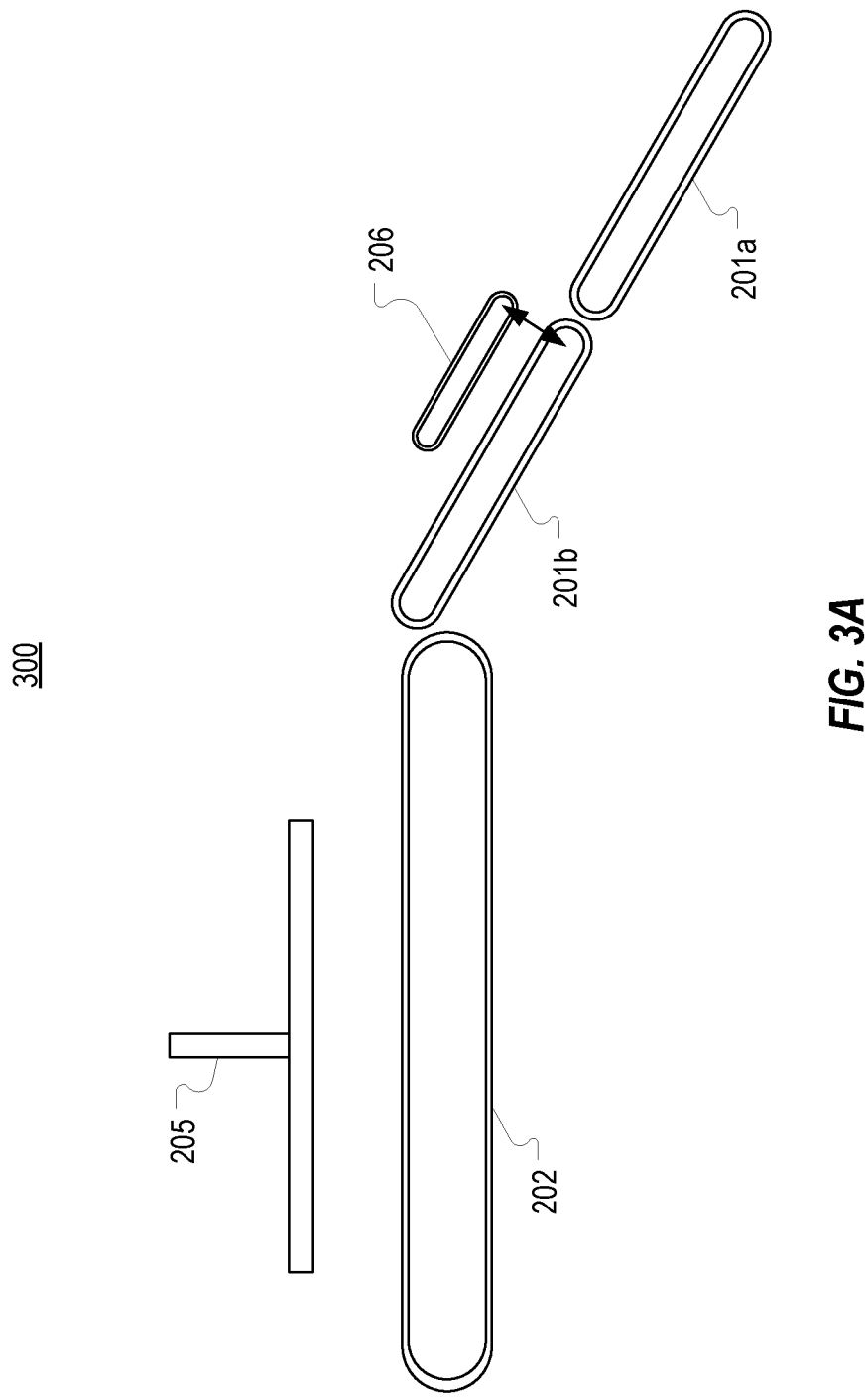

FIGS. 3A and 3B depict an embodiment of a sod harvester 300 in which second inclined conveyor 201b and auxiliary stacking conveyor 206 are pivoted between a raised and a lowered position (as represented by the arrow) to allow slabs of sod to be advanced from first inclined conveyor 201a onto either second inclined conveyor 201b or auxiliary stacking conveyor 206. In FIG. 3A, second inclined conveyor 201b and auxiliary stacking conveyor 206 are in the raised position. In this raised position, slabs of sod advancing on first inclined conveyor 201a will continue onto second inclined conveyor 201b. In contrast, in FIG. 3B, second inclined conveyor 201b and auxiliary stacking conveyor 206 are in the lowered position. In this lowered position, slabs of sod advancing on first inclined conveyor 201a will continue onto auxiliary stacking conveyor 206.

Figure 4A:
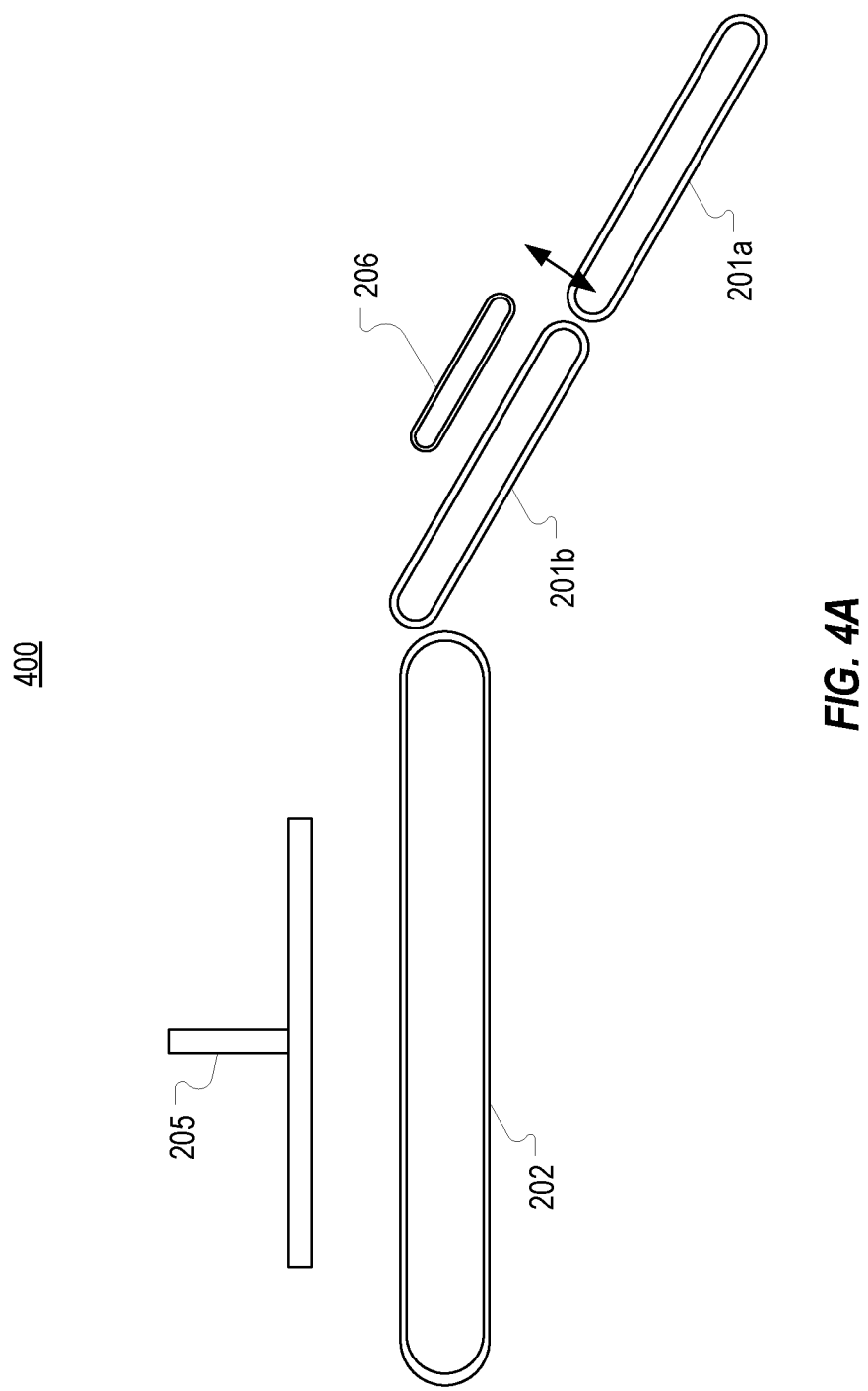
FIGS. 4A and 4B illustrate an embodiment of a sod harvester where a first inclined conveyor pivots between a raised and a lowered position to selectively advance slabs of sod from the first inclined conveyor onto either the auxiliary stacking conveyor or the second inclined conveyor.
Figure 4B:
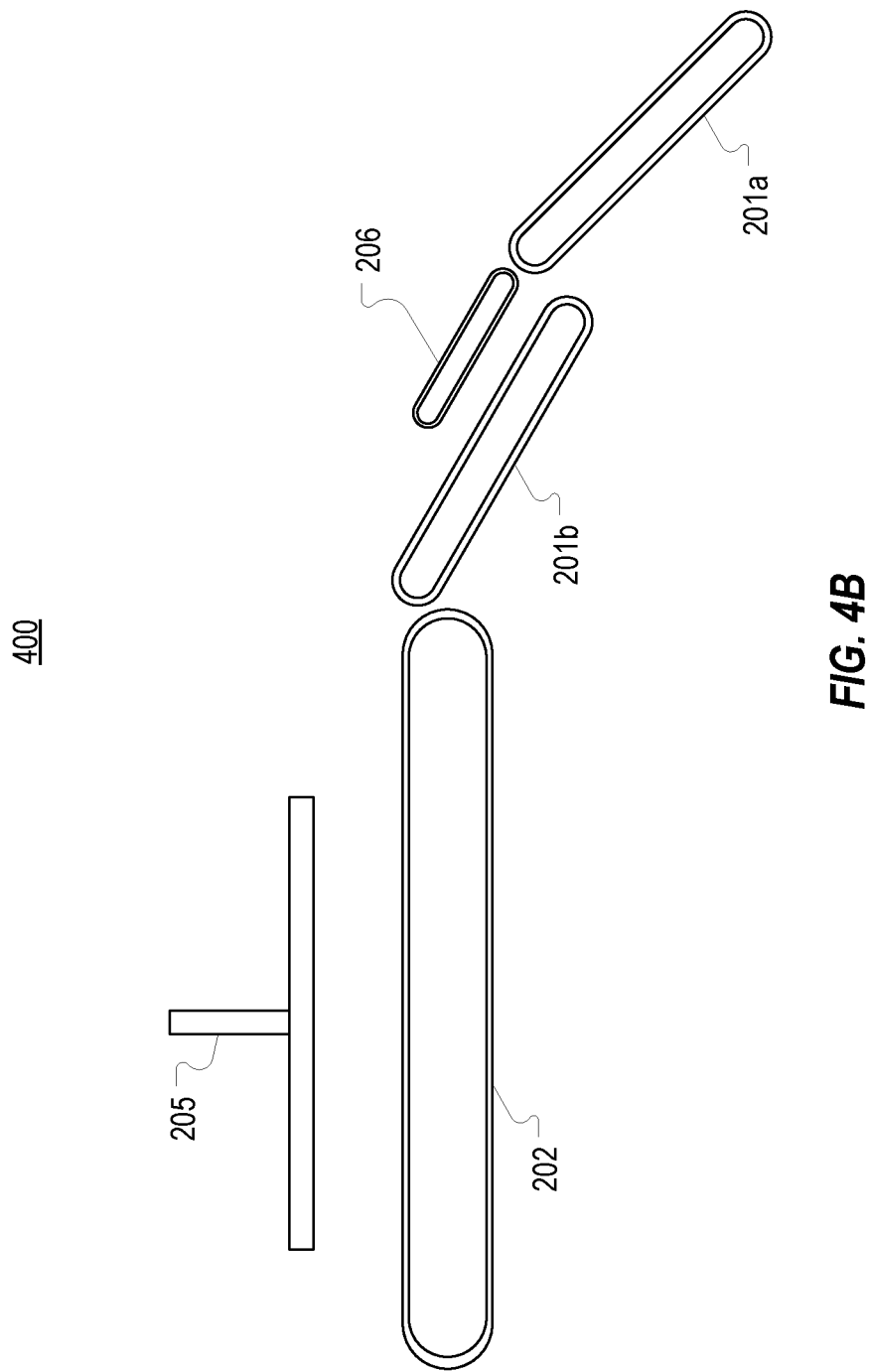

FIGS. 4A and 4B depict an embodiment of a sod harvester 400 in which first inclined conveyor 201a is pivoted between a raised and lowered position (as represented by the arrow) to allow slabs of sod to be advanced onto either second inclined conveyor 201b or auxiliary stacking conveyor 206. In this embodiment, FIG. 4A represents the lowered position, while FIG. 4B represents the raised position of first inclined conveyor 201a.

Figure 5A:
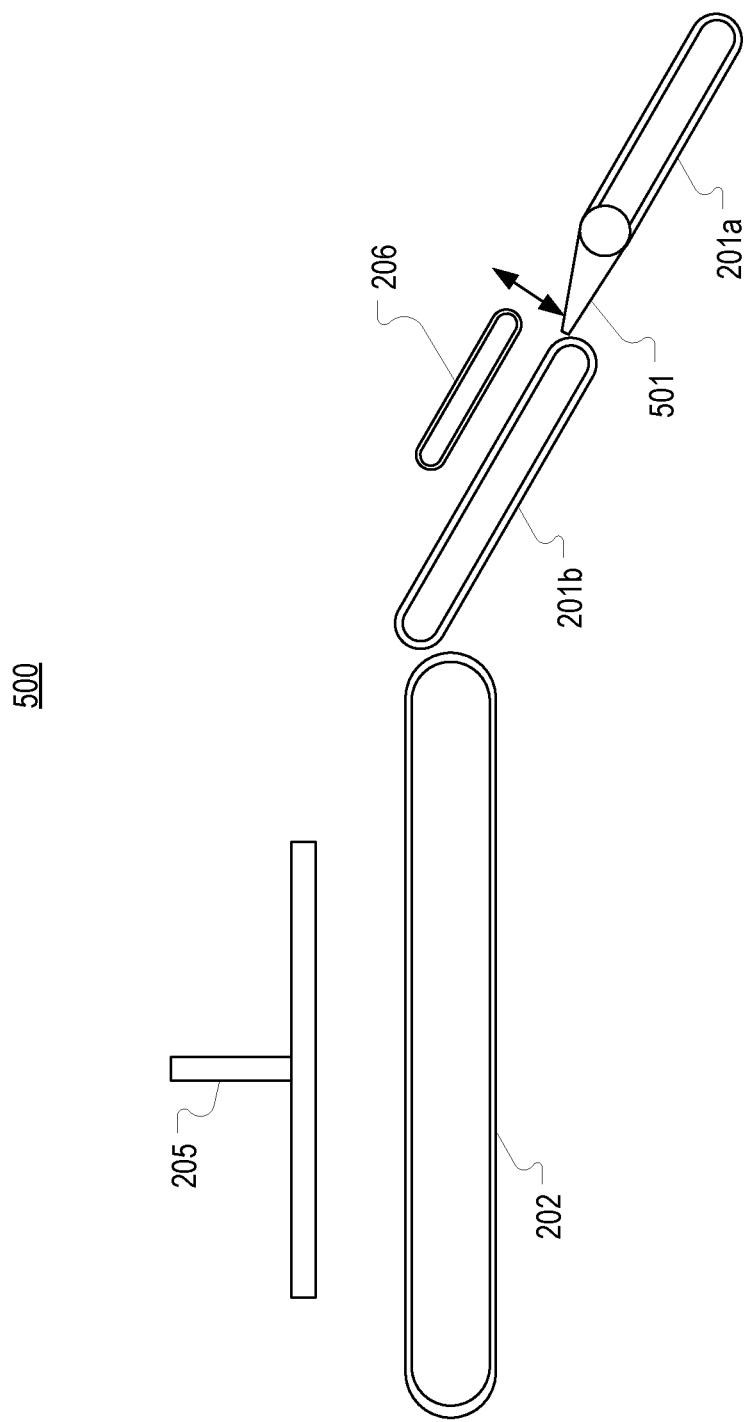
FIGS. 5A and 5B illustrate an embodiment of a sod harvester where a gate positioned between a first inclined conveyor and a second inclined conveyor pivots between a raised and a lowered position to selectively advance slabs of sod from the first conveyor onto either the auxiliary stacking conveyor or the second inclined conveyor.
Figure 5B:
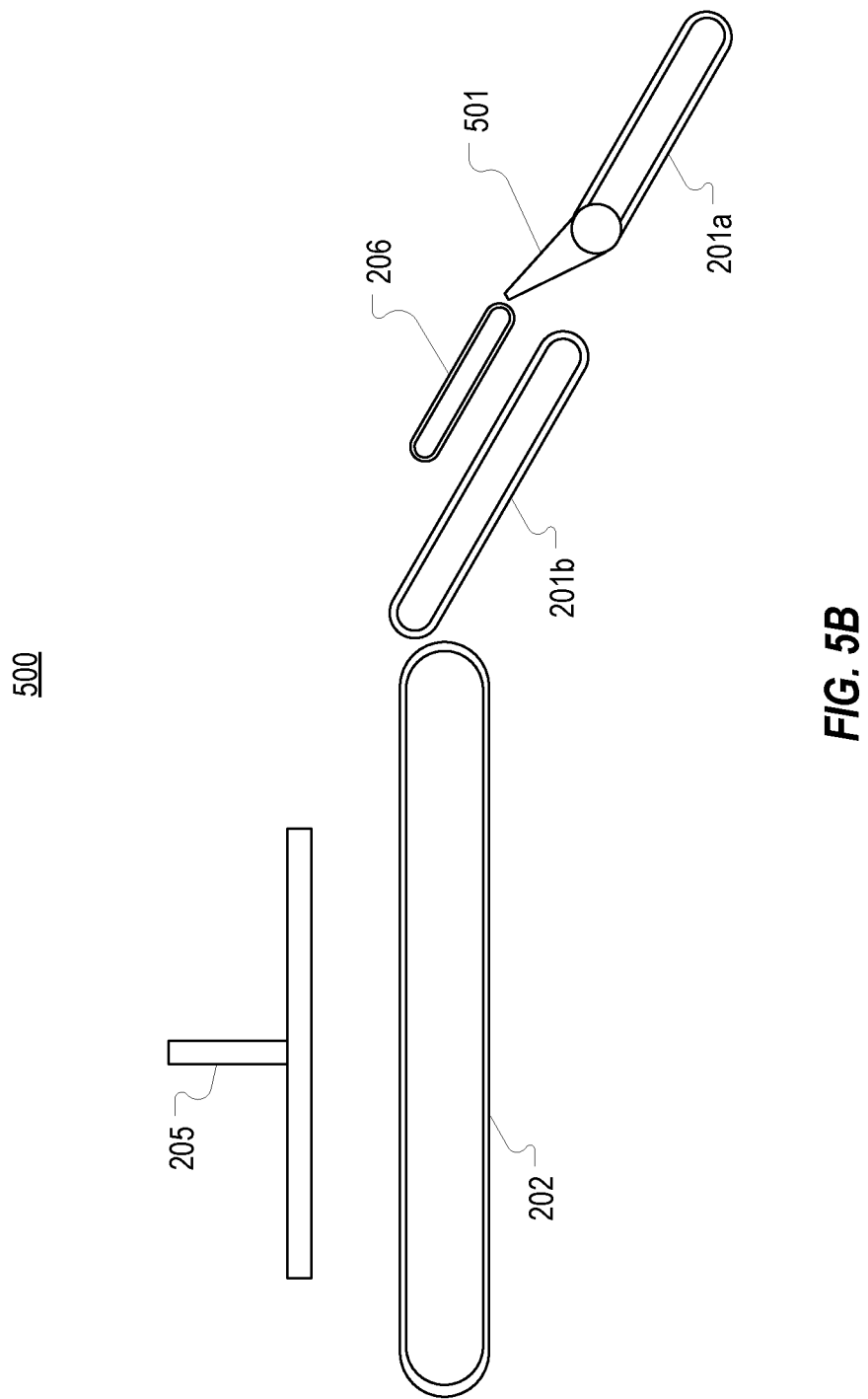

FIGS. 5A and 5B depict an embodiment of a sod harvester 500 in which a gate 501 is positioned between first inclined conveyor 201a and second inclined conveyor 201b. Gate 501 can pivot between a raised position (shown in FIG. 5B) and a lowered position (shown in FIG. 5A). When in the raised position, gate 501 will cause slabs of sod to be advanced from first inclined conveyor 201a onto auxiliary stacking conveyor 206. In contrast, when in the lowered position, gate 501 will cause slabs of sod to be advanced onto second inclined conveyor 201b.

Although not depicted, in some embodiments, each of the conveyors may pivot to cause proper alignment in the conveyors. For example, to reach the configuration shown in FIGS. 3B and 4B, first inclined conveyor 201a may pivot upwardly while auxiliary stacking conveyor 206 may pivot downwardly. Similarly, to reach the configuration shown in FIG. 5B, gate 501 may pivot upwardly while auxiliary stacking conveyor 206 may pivot downwardly. Accordingly, the particular manner in which the sod harvester toggles between routing slabs to second inclined conveyor 201b and to auxiliary stacking conveyor 206 is not essential to the invention.

In any of these embodiments, alternate slabs of sod can be advanced onto auxiliary stacking conveyor 206 to allow such slabs to be stacked on corresponding trailing slabs. This process of stacking slabs using auxiliary stacking conveyor 206 is illustrated in FIGS. 6A-6J using sod harvester 400 as an example. It is noted, however, that the process of stacking slabs would be performed in substantially the same manner by sod harvester 300, sod harvester 500, or another similarly configured sod harvester.

In general, auxiliary stacking conveyor 206 functions as a buffer for temporarily storing a slab that is to be stacked on top of a trailing slab. Accordingly, each leading slab can be advanced onto auxiliary stacking conveyor 206 (either by pivoting first inclined conveyor 201 as shown in FIGS. 6A-6J, by pivoting second inclined conveyor 201b and auxiliary stacking conveyor 206, by pivoting gate 501, or by some combination of these functions).

FIG. 6A represents a state of operation in which slabs of sod are beginning to be cut from the ground and advanced onto first inclined conveyor 201a. Because no slab is positioned on top of auxiliary stacking conveyor 206, first inclined conveyor 201a is in the raised position so that a leading slab, slab 301a, will be advanced onto auxiliary stacking conveyor 206.

FIG. 6B illustrates that slab 301a has been advanced onto auxiliary stacking conveyor 206 where it will be maintained (e.g., by stopping auxiliary stacking conveyor 206) to await a trailing slab, slab 301b. Once slab 301a has been advanced onto auxiliary stacking conveyor 206, first inclined conveyor 201a is returned to the lowered position so that slab 301b will be advanced onto second inclined conveyor 201b as shown in FIG. 6C. During this pivoting, first inclined conveyor 201a can continue to rotate to cause slab 301c to be advanced onto first inclined conveyor 201a.

As shown in FIG. 6D, once slab 301b has been advanced onto second inclined conveyor 201b, first inclined conveyor 201a can again be pivoted into the raised position. First inclined conveyor 201a can continue rotating during this upward pivoting. FIG. 6D also shows that, as slab 301b continues advancing along second inclined conveyor 201b, auxiliary stacking conveyor 206 can commence rotating to cause slab 301a to be advanced on top of slab 301b. In this way, a set of stacked slabs is formed on second inclined conveyor 201b with slab 301a, the leading slab, being stacked on top of slab 301b, the trailing slab, as shown in FIG. 6E.

This preliminary stacking process can continue on subsequent slabs. For example, as shown in FIG. 6E, slab 301c can be advanced onto auxiliary stacking conveyor 206. Second inclined conveyor 201b can continue to advance the set of stacked slabs 301a, 301b towards stacking conveyor 202. With slab 301c advanced onto auxiliary stacking conveyor 206, first inclined conveyor 201a can pivot downwardly to feed slab 301d onto second inclined conveyor 201b. The continued rotation of second inclined conveyor 201b can cause the set of stacked slabs 301a, 301b to reach stacking conveyor 202 which may also be rotated to cause the set of stacked slabs to be positioned towards a front end of the stacking conveyor. Stacking conveyor 202 may be stopped in this position to allow multiple sets of stacked slabs to be accumulated on stacking conveyor 202 in accordance with the techniques described in the '402 application.

FIG. 6G illustrates that a second set of stacked slabs 301c, 301d is formed on second inclined conveyor 201b as described above. This second set of stacked slabs 301c, 301d can be advanced towards stacking conveyor 202 as shown in FIG. 6H as the preliminary stacking process continues on slabs 301e, 301f, 301g, etc.

FIG. 6I represents that the second set of stacked slabs 301c, 301d has reached the first set of stacked slabs 301a, 301b. At this moment, stacking conveyor 202 can be advanced to cause the accumulated sets of stacked slabs to be positioned underneath stacking head 205 which can simultaneously remove the two sets of stacked slabs from stacking conveyor 202 for stacking on a pallet.

In this example, it will be assumed that stacking head 205 is configured to remove two sets of stacked slabs (i.e., four slabs) at a time. However, stacking head 205 could also be configured to remove any number of sets of stacked slabs (e.g., three sets or six total slabs) at a time depending on the dimensions of the slabs. In any case, once the appropriate number of sets of stacked slabs is accumulated on stacking conveyor 202, the stacking conveyor can be advanced to position the sets of stacked slabs underneath stacking head 205.

Stacking head 205 can secure both layers of the stacked slabs in any suitable manner such as by piercing through both layers. Suitable examples of a stacking head 205 are described in the '316 application. Additionally, the techniques described in the '316 application for controlling movement of the stacking conveyor and/or stacking head can be used to further increase the rate at which stacking head 205 can remove slabs from stacking conveyor 202.

Because stacking head 205 removes two layers of slabs with each stacking operation, stacking head 205 effectively doubles the number of slabs that are stacked with each stacking operation. Accordingly, the stacking operation does not need to be performed as frequently as when a single layer is stacked at a time. Given that the stacking operation is oftentimes the bottleneck during the harvesting process, the present invention can allow the sod harvester to be operated at greater ground speeds.

Further, although stacking double the amount of slabs increases the amount of energy that is required to perform a single stacking operation (e.g., due to the increased weight that stacking head 205 must move), the reduction in the number of stacking operations that must be performed provides a net energy savings. Therefore, the present invention provides benefits in the form of efficiency and yield.

Figure 7:
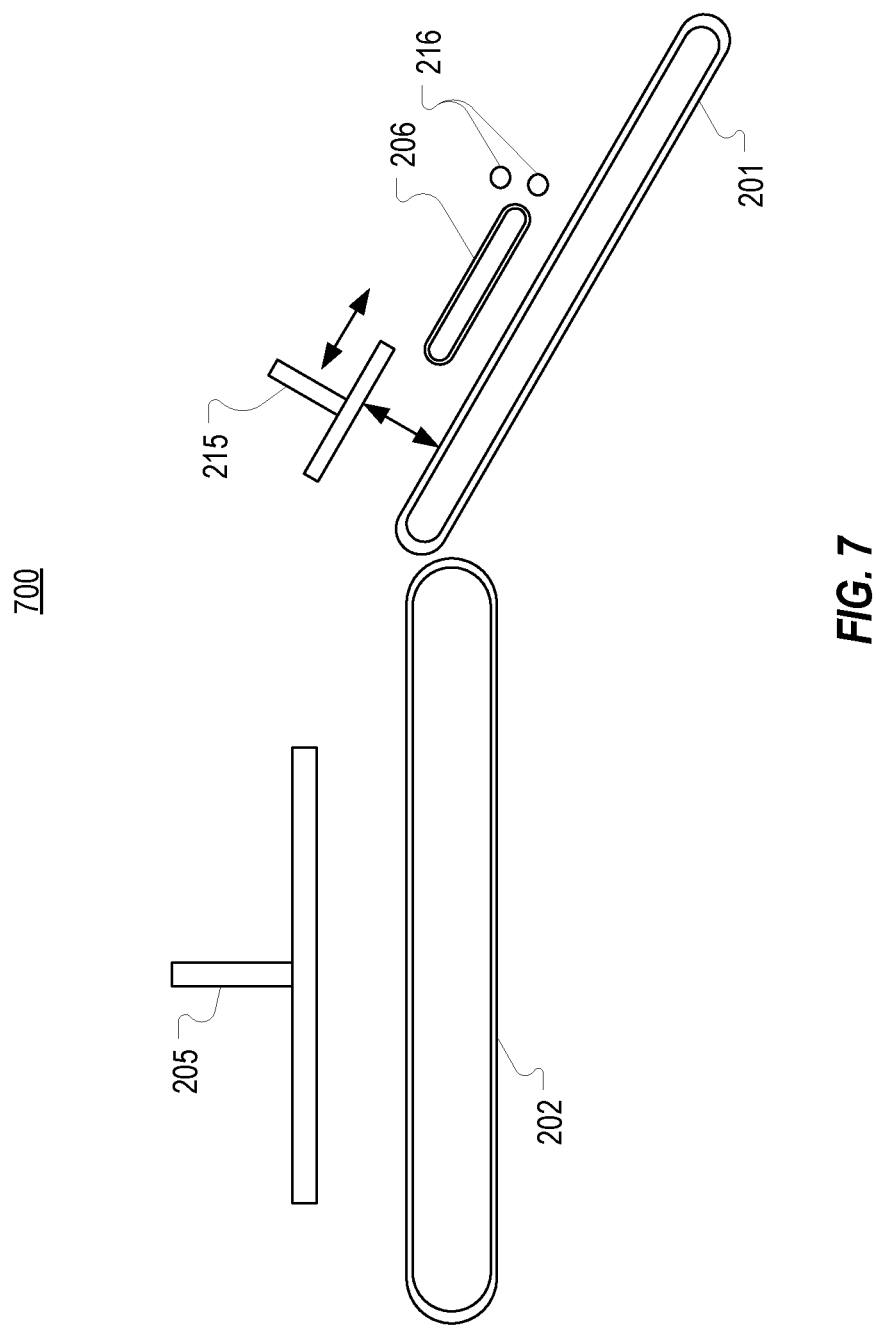
FIG. 7 illustrates an embodiment of a sod harvester that includes an auxiliary stacking conveyor and an auxiliary stacking head for placing slabs on sod on the auxiliary stacking conveyor.

In the above described embodiments, the slabs of sod are stacked in a dirt-to-grass orientation (i.e., both slabs in the stack are oriented with the grass side up). However, in some embodiments, it may be desirable to stack the slabs in a grass-to-grass orientation (i.e., with the top slab being oriented with the grass side down and the bottom slab being oriented with the grass side up). FIG. 7 illustrates an embodiment of a sod harvester 700 that is configured to allow slabs to be stacked in this grass-to-grass orientation.

Sod harvester 700, as with the previously described sod harvesters, includes an auxiliary stacking conveyor 206. Additionally, sod harvester 700 includes an auxiliary stacking head 215 and inverting guides 216. Auxiliary stacking head 215 is configured to pick up slabs of sod from inclined conveyor 201, after the slabs have passed under auxiliary stacking conveyor 206, and place them on top of auxiliary stacking conveyor 206. Accordingly, auxiliary stacking head 215 can be configured to move in a generally up and down and forward and backward direction as indicated by the arrows in FIG. 7. It is noted that, in some embodiments, auxiliary stacking head 215 could be positioned prior to auxiliary stacking conveyor 206. However, regardless of where auxiliary stacking head 215 is positioned with respect to auxiliary stacking conveyor 206, its function can be substantially the same as described below.

Once auxiliary stacking head 215 places a slab on auxiliary stacking conveyor 206, auxiliary stacking conveyor 206 can be rotated in a direction opposite the rotation of inclined conveyor 201 (i.e., in a clockwise direction in FIG. 7) to cause the slab to be dropped off the front edge of auxiliary stacking conveyor 206. Inverting guides 216 can be positioned to cause the rear (or right) edge of the slab to rotate in a clockwise direction thereby causing the slab to invert on top of a trailing slab. Inverting guides 216 can be any structure capable of guiding this inversion of the slab as it descends from auxiliary stacking conveyor 206. Although sod harvester 700 is shown as including two inverting guides 216, any number of inverting guides, including a single inverting guide, could be employed. This process of stacking slabs in the grass-to-grass orientation is depicted in FIGS. 7A-7H.

Figure 7A:
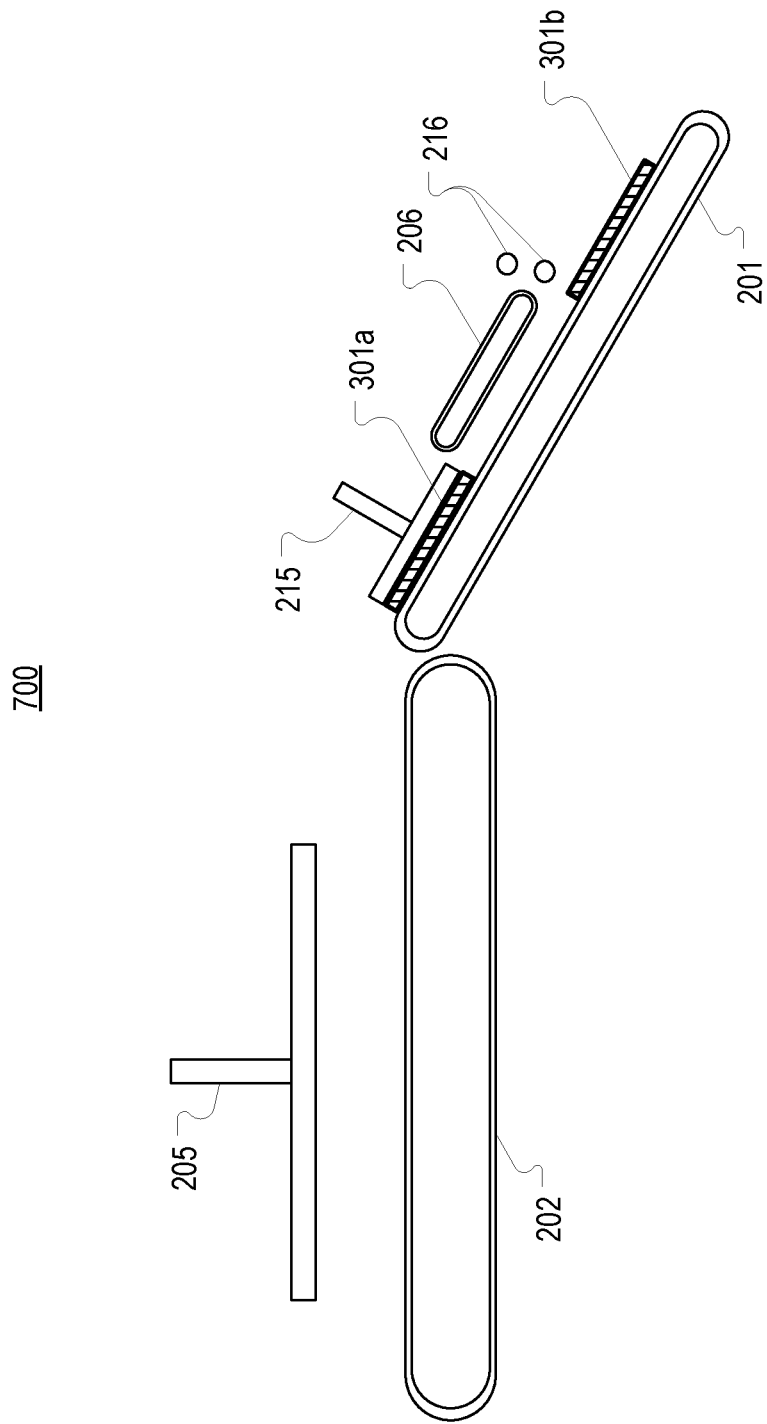
FIGS. 7A-7H illustrate a sequence of views of the sod harvester of FIG. 7 depicting how the auxiliary stacking head and auxiliary stacking conveyor operate to stack slabs of sod in an inverted manner on the inclined conveyor.
Figure 7B:
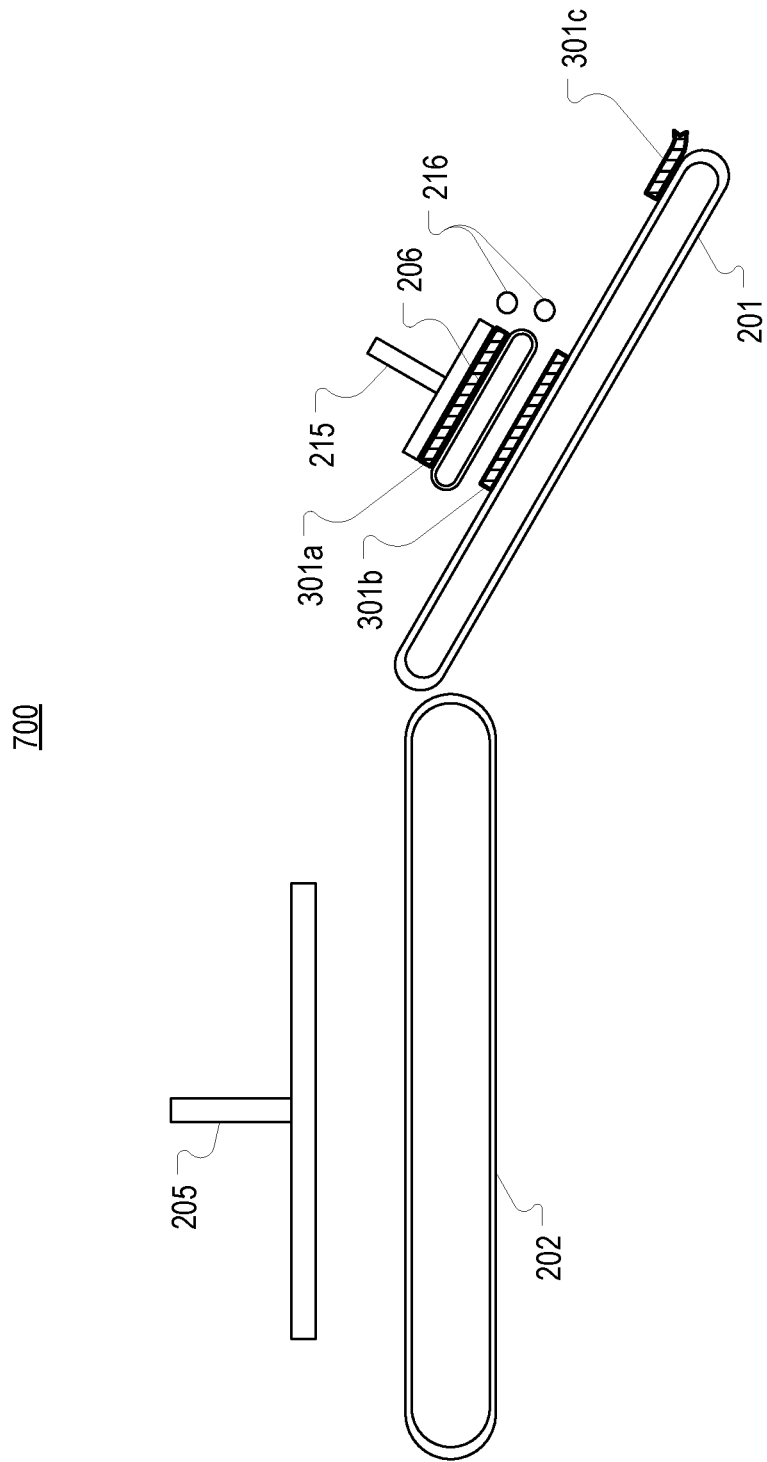

In FIG. 7A, a leading slab, slab 301a, and a trailing slab, slab 301b, are shown advancing along inclined conveyor 201. As slab 301a is positioned underneath auxiliary stacking head 215, the auxiliary stacking head descends to pick up the slab. Then, as shown in FIG. 7B, auxiliary stacking head 215 moves overtop auxiliary stacking conveyor 206 to place slab 301a on top of auxiliary stacking conveyor 206. Slab 301a can remain on top of auxiliary stacking conveyor 206 until a corresponding slab, which is slab 301c in this example, has been advanced to the proper position on inclined conveyor 201.

Figure 7C:
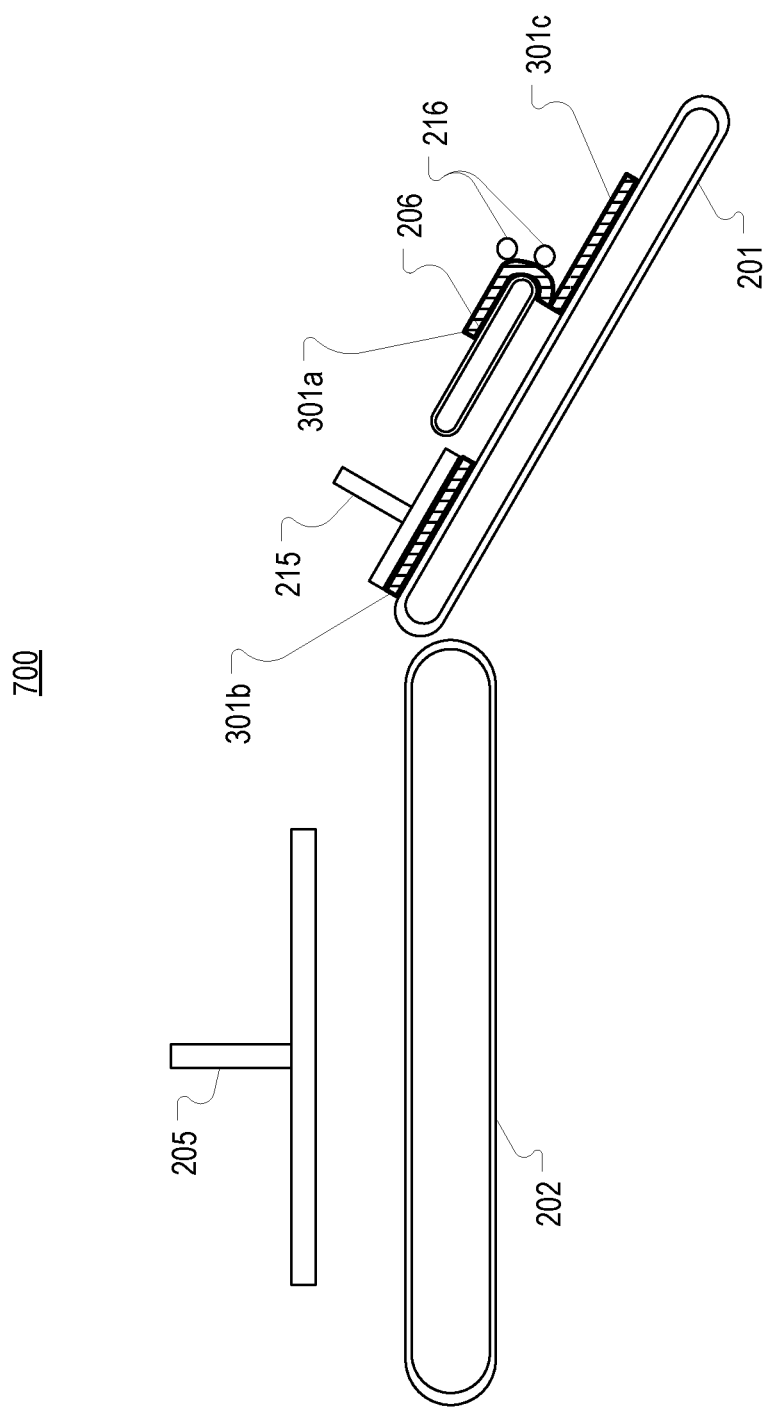

As shown in FIG. 7C, after placing slab 301a on auxiliary stacking conveyor 206, auxiliary stacking head 215 returns to pick up slab 301b. As also shown in FIG. 7C, as slab 301c reaches the appropriate position on inclined conveyor 201, auxiliary stacking conveyor 206 can be advanced to cause slab 301a to be inverted on top of slab 301c. The position of inverting guides 216 causes the rear (or right) edge of slab 301a to rotate clockwise so that slab 301a will be positioned with its grass side facing down.

Figure 7D:
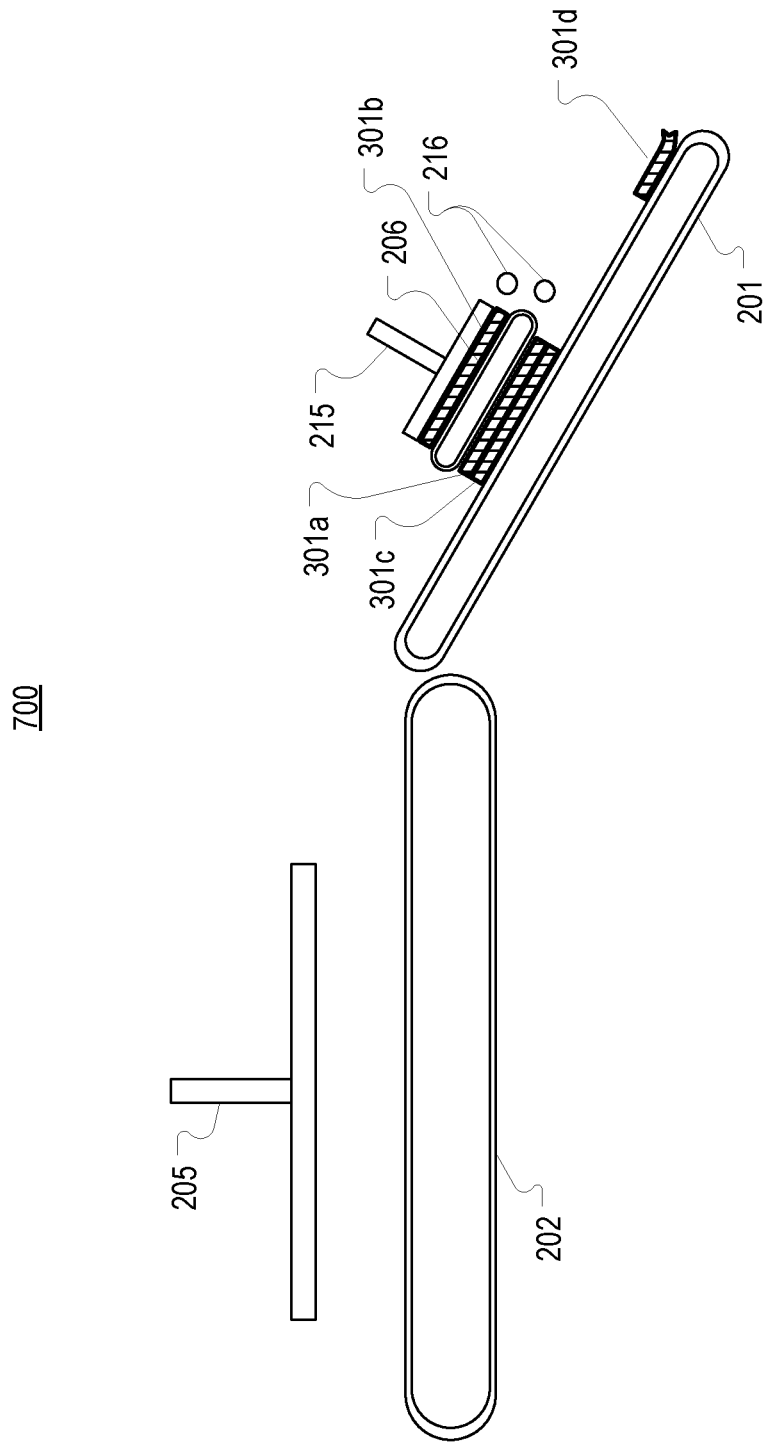
Figure 7E:
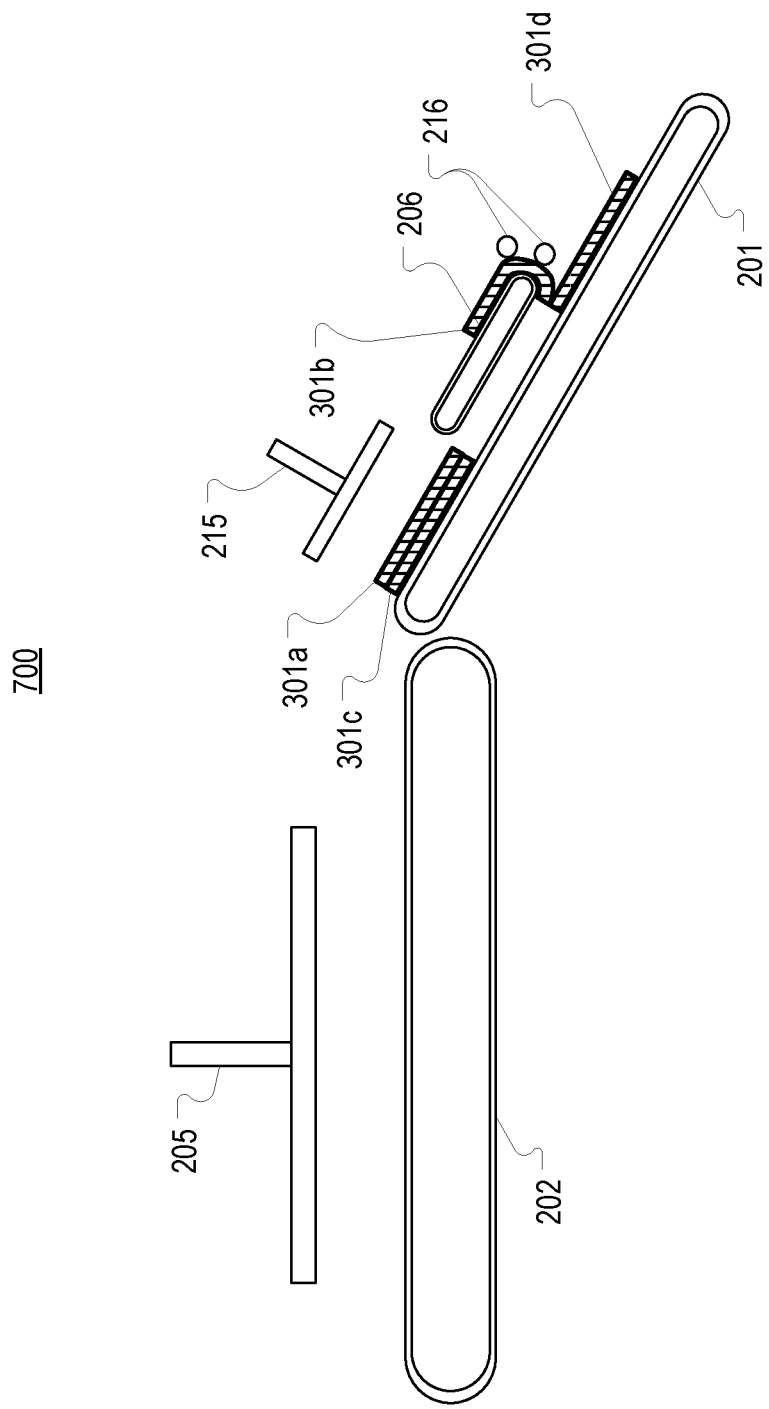

FIG. 7D illustrates that the stack of slabs 301a, 301c continues to advance along inclined conveyor 201 as slab 301b is placed on top of auxiliary stacking conveyor 206. As shown in FIG. 7E, after placing slab 301b on auxiliary stacking conveyor 206, auxiliary stacking head 215 can return to its base position to await the next slab. As slab 301d reaches the appropriate position, auxiliary stacking conveyor 206 can advance slab 301b to invert it on top of slab 301d.

Figure 7F:
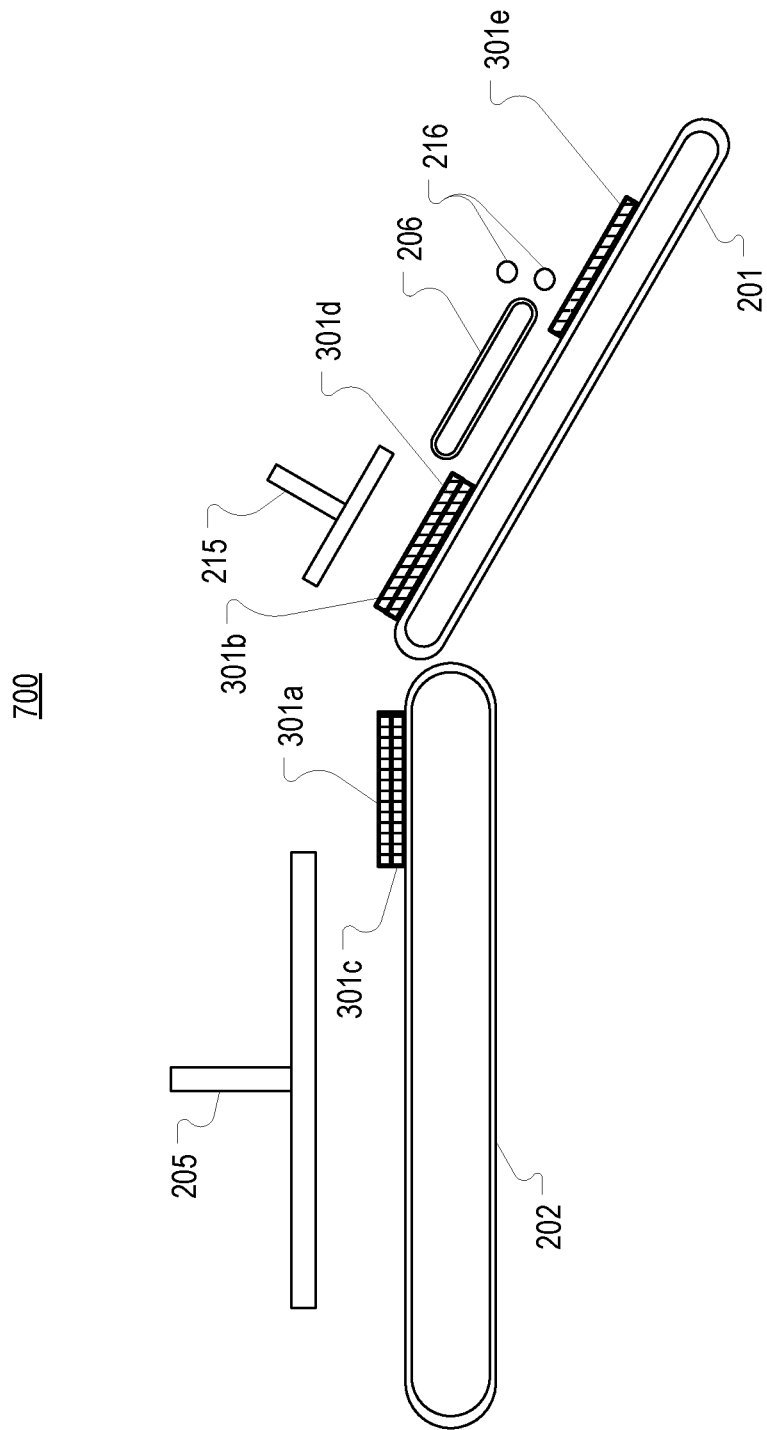
Figure 7G:
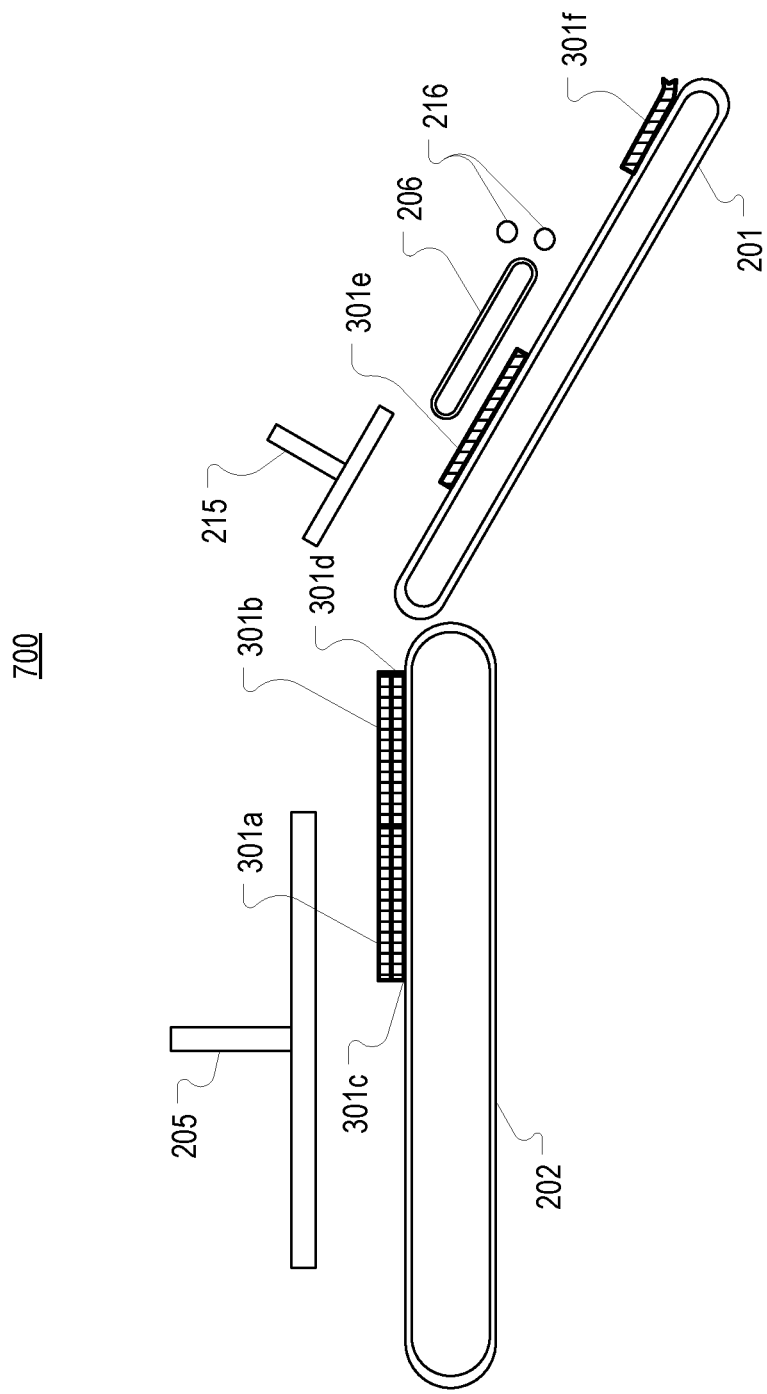

During this process, inclined conveyor 201 can be continuously rotated. Accordingly, the stack of slabs 301a, 301c and the stack of slabs 301b, 301d are advanced towards and onto stacking conveyor 202 as shown in FIGS. 7F and 7G. Also, this continuous rotation of inclined conveyor 201 causes slabs 301e and 301f to advance towards auxiliary stacking head 215.

Figure 7H:
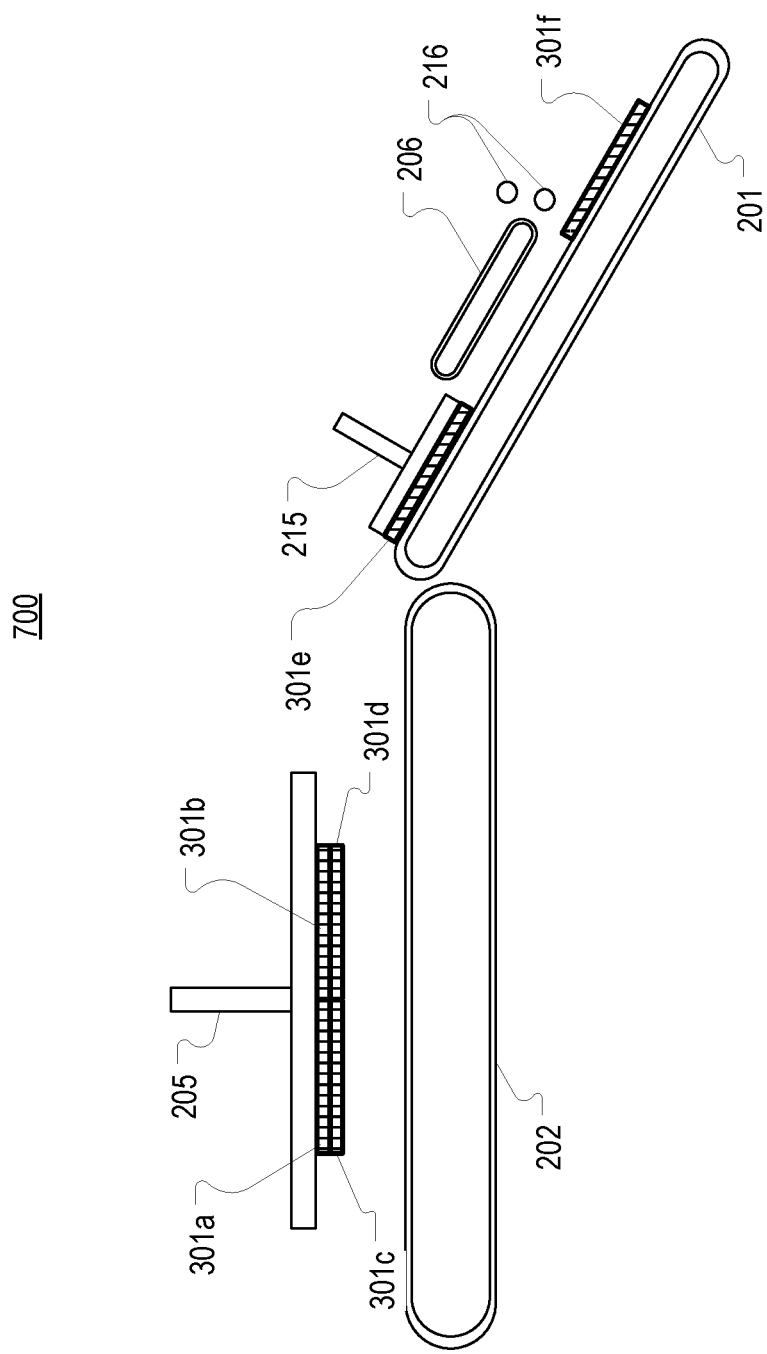

Once slab 301e reaches the appropriate position, auxiliary stacking head 215 descends to pick up the slab to continue the process depicted in FIGS. 7A-7G. As represented in FIG. 7H, stacking conveyor 202 can be configured to accumulate two or more stacks of slabs prior to positioning the stacks underneath stacking head 205 in accordance with the techniques described in the '402 application.

As can be seen in these figures, a slab can be stacked in an upside-down manner on top of another slab. To facilitate stacking slabs in this manner without slowing the ground speed of the sod harvester, a slab can be stacked, not on an immediately trailing slab, but on the next following slab (e.g., a first slab could be stacked on a third slab, a second slab could be stacked on a fourth slab, etc.). However, it is noted that it is not necessary to pick up two consecutive slabs for stacking on two other consecutive slabs. The exact pattern with which slabs are handled can vary based on various factors including the rate at which slabs pass under auxiliary stacking conveyor 206, the distance between auxiliary stacking head 215 and auxiliary stacking conveyor 206, an amount of time required to pick up a slab and place it on auxiliary stacking conveyor 206, whether a slab has already been picked up or placed on auxiliary stacking conveyor 206, etc.

Each of the above described embodiments can be implemented to form stacks of multiple slabs on an inclined conveyor of a sod harvester. However, in some embodiments, it may be preferable to form a "stack" from a single slab of sod. In other words, a single long slab of sod could be folded in half to create a stack with a grass-to-grass orientation. Such folded slabs will hereafter be referred to as "folded stacks."

Any sod harvester 200 having an auxiliary stacking conveyor 206 positioned overtop a second inclined conveyor 201b could be employed to form folded stacks on an inclined conveyor including the embodiments of sod harvester 200, 300, and 400 described above. For example, FIGS. 8A-8F illustrate how auxiliary stacking conveyor 206 can be employed to form folded stacks in an embodiment of sod harvester 400.

FIGS. 8A and 8B illustrate that first inclined conveyor 201a can initially be in the raised position to feed a slab 301a partially onto auxiliary stacking conveyor 206. Once slab 301a has advanced partially onto auxiliary stacking conveyor 206, first inclined conveyor 201a can be dropped into the lowered position as shown in FIG. 8C. As it is dropped, first inclined conveyor 201a can continue to rotate while the rotation of auxiliary stacking conveyor 206 can be reversed. The reversing of auxiliary stacking conveyor 206 along with the continued advancement of first inclined conveyor 201a causes the front half of slab 301a to fold backwards on top of the back half of slab 301a as shown in FIG. 8D. In this way, slab 301a forms a folded stack on inclined conveyor 201b.

As shown in FIGS. 8E and 8F, slab 301a advances as a folded stack onto stacking conveyor 202 while a subsequent slab 301b advances onto auxiliary stacking conveyor 206 to again initiate the folding process. This folding of slabs could be accomplished in substantially the same manner when implemented on sod harvester 300 (e.g., by pivoting second inclined conveyor 201b and auxiliary stacking conveyor 206) and sod harvester 500 (e.g, by pivoting gate 501).

Figure 9A:
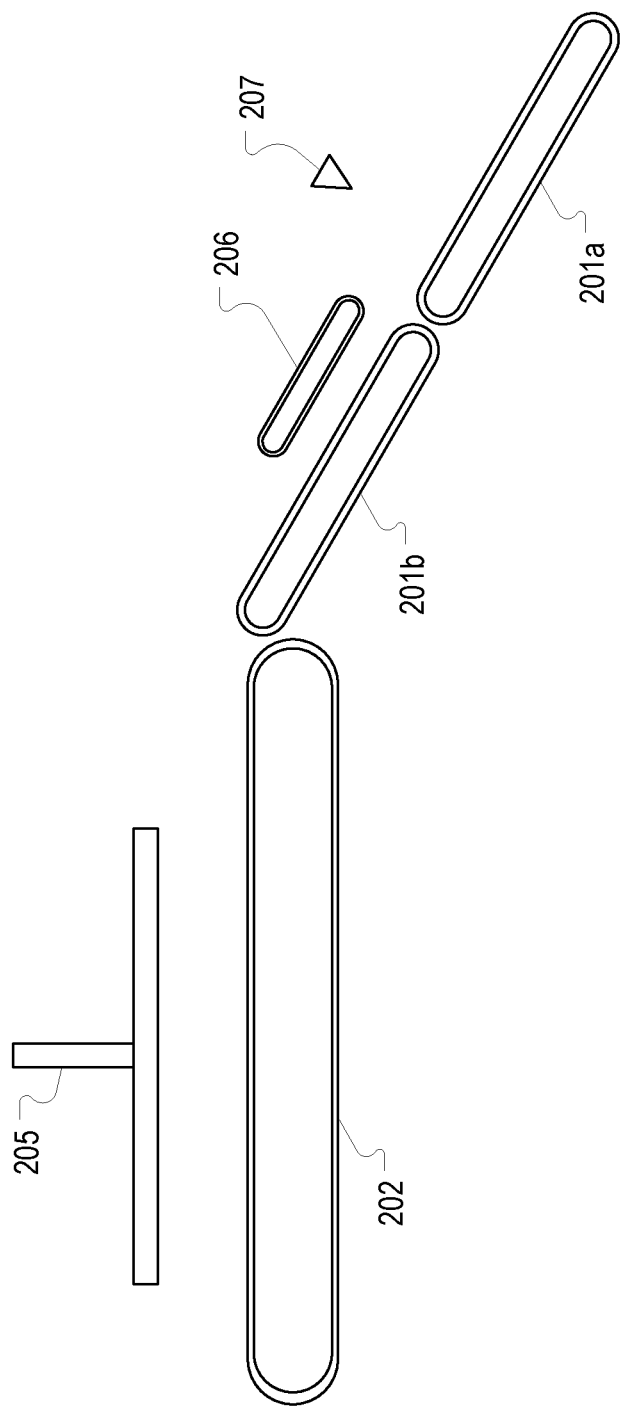

In order to operate auxiliary stacking conveyor 206 (as well as auxiliary stacking head 215) with the appropriate timing, a sod harvester may include one or more sensors. FIG. 9A illustrates an example of how a sensor 207 could be positioned overtop first inclined conveyor 201a prior to auxiliary stacking conveyor 206. Of course, one or more sensors 207 could alternatively or additionally be positioned in other locations (e.g., to the side of first inclined conveyor 201a) to perform similar functions as will be described. In this example, sensor 207 could be an optical sensor that senses the leading and/or trailing edge of a slab of sod as the slab travels along first inclined conveyor 201. Other positions and/or types of sensors could alternatively or additionally be provided. For example, a sensor may be positioned overtop auxiliary stacking conveyor 206. In short, any sensor or sensors that can be used to identify the position of a slab of sod on first inclined conveyor 201a (or inclined conveyor 201 in sod harvester 700) and/or on auxiliary stacking conveyor 206 could be used.

Based on input from sensor 207, a control unit (not shown) could calculate when a slab will be appropriately positioned for advancement onto auxiliary stacking conveyor 206 or for pickup by auxiliary stacking head 215. For example, the control unit could be configured to receive input from sensor 207 indicative of when the leading and trailing edges are sensed. Based on this input (and assuming the control unit knows the dimensions of the slab), the control unit could calculate the speed at which first inclined conveyor 201a (or similarly the speed at which second inclined conveyor 201b or inclined conveyor 201) is operating. Based on a calculated speed, the control unit could determine when a slab will reach the end of first inclined conveyor 201a or reach a position underneath auxiliary stacking head 215. Alternatively, if the speed of an inclined conveyor is a known parameter (e.g., based on input from another sensor), the control unit could be configured to receive input from sensor 207 indicative of a single edge of the slab (i.e., of either the leading or trailing edge) and from such input identify when to perform proper adjustments to the sod harvester.

These adjustments will vary based on the particular embodiment employed. For example, in sod harvester 300, input from sensor 207 could be used to control the timing of the pivoting of the conveyors as well as the timing and/or speed of rotation of auxiliary stacking conveyor 206 (both to advance a slab onto the conveyor and to advance a slab off the conveyor). Similarly, with sod harvester 400, input from sensor 207 could be used to control when first inclined conveyor 201a is pivoted and to control the timing and/or speed of rotation of auxiliary stacking conveyor 206. With sod harvester 500, input from sensor 207 could be employed to control when gate 501 pivots and when auxiliary stacking conveyor 206 is rotated. In summary, in any of these cases, the input from sensor 207 can be used to calculate proper timing to ensure that a slab is stacked on top of another slab.

Similarly, input from sensor 207 could be employed to control the timing of operation of auxiliary stacking head 215 in sod harvester 700. This input could also be used to control when auxiliary stacking conveyor 206 rotates to ensure that a slab is properly inverted on top of a trailing slab.

Further, in embodiments where folded stacks are formed, input from sensor 207 could be employed to control when auxiliary stacking conveyor 206 reverses its rotation. In particular, this input could be used to calculate when the slab's direction should be reversed to ensure that the slab folds in half. This calculation could vary based on a number of factors (some of which may be dynamically determined) such as the water content of the slab, the type of grass, the type of soil, or any other measurable factor that may affect how a slab will fold.

FIG. 9B illustrates an example of how a sensor 208 could be positioned after auxiliary stacking conveyor 206 (e.g., overtop second inclined conveyor 201b or stacking conveyor 202). Sensor 208 could be used to verify whether slabs are being stacked in alignment and could be used alone or in conjunction with sensor 207 to monitor proper operation of the stacking or folding operation.

If slabs were stacked out of alignment, sensor 208 could detect the misalignment in either the leading edges or the trailing edges of the slabs. In cases where folded stacks are formed, misalignment could be detected at the trailing (or non-folded) edges. FIGS. 9C and 9D illustrate instances where the top slab is advanced off of auxiliary stacking conveyor 206 too soon and too late respectively. In each of FIGS. 9C and 9D, two stacked slabs are represented as moving from right to left along the top surface of second inclined conveyor 201b (or equally along inclined conveyor 201 or stacking conveyor 202) as they pass under sensor 208 (represented in dashed lines). Whenever slabs are stacked in misalignment, sensor 208 (which can preferably be an optical sensor) can identify the misalignment by detecting a three-step transition as the stacked slabs pass under the sensor.

In FIG. 9C, because the top slab was released too soon, the leading edge of the top slab overlaps the leading edge of the bottom slab. Therefore, as the stacked slabs pass under sensor 208, the sensor will detect a first transition from the top surface of second inclined conveyor 201b to the top surface of the top slab. In FIG. 9C, this first transition is represented as occurring at time $t_1$. Then, due to the misalignment, sensor 208 will detect a second transition from the top surface of the top slab to the top surface of the bottom slab. This second transition is represented as occurring at time $t_2$. Shortly thereafter, sensor 208 will detect a third transition from the top surface of the bottom slab to the top surface of second inclined conveyor 201b. This third transition is represented as occurring at time $t_3$.

In FIG. 9D, because the top slab was released too late, the trailing edge of the top slab overlaps the trailing edge of the bottom slab. In this case, sensor 208 will still detect a three-step transition in a similar manner as described above; however, the spacing of the transitions will differ. In particular, in the case depicted in FIG. 9D, the second transition occurs shortly after the first transition. Of course, if the slabs are perfectly aligned, sensor 208 would only detect two transitions.

A control unit can be configured to process signals received from sensor 208 indicative of the occurrence of these transitions and cause the operation of auxiliary stacking conveyor 206 to be updated appropriately. For example, if sensor 208 provides signals indicative of a two-step transition (i.e., indicative that the slabs are aligned), the control unit can continue to operate auxiliary stacking conveyor 206 with the same timing. However, if sensor 208 provides signals indicative of a three-step transition, the control unit can process the signals to identify whether the top slab is being released too early or too late. For example, by comparing the amount of time between the first and second transitions to the amount of time between the second and third transitions, the control unit can determine how the slabs are misaligned. In particular, if the amount of time between the first and second transitions is greater than the amount of time between the second and third transitions (as represented in FIG. 9C), the control unit can determine that the top slab is being released too early. Further, in such cases, the amount of time between the second and third transitions can be used to identify how early the top slab is being released (e.g., with reference to the speed of the inclined conveyor as determined by sensor 207 or another sensor). Similarly, if the amount of time between the first and second transitions is less than the amount of time between the second and third transitions (as shown in FIG. 9D), the control unit can determine that the top slab is being released too late. Further, in such cases, the amount of time between the first and second transitions can be used to identify how late the top slab is being released. In either case, whenever the amount of time between the corresponding transitions exceeds some threshold, the control unit can update the timing of the operation of auxiliary stacking conveyor 206 to attempt to better align subsequently stacked slabs.

In one particular example, the control unit may employ a timing offset to control the operation of auxiliary stacking conveyor 206 with reference to a signal from sensor 207. For example, when receiving a signal from sensor 207 identifying the leading edge of a slab, the control unit may employ the timing offset to determine the time when auxiliary stacking conveyor 206 should be advanced to drop a slab on top of another slab (e.g., 0.2 ms after detecting the leading edge). Based on feedback from sensor 208, the control unit may update this timing offset to ensure that slabs remain in alignment.

It is noted that with folded stacks it may not be possible to detect a three-step transition when the top portion of the folded slab overlaps the bottom portion. In particular, if sensor 208 is positioned above second inclined conveyor 201b, it will only be able to detect the folded edge and the overlapped top edge. In such cases, it may not be possible to determine whether the slab is folded in perfect alignment or whether the top is overlapping.

To address this difficulty without requiring additional sensors or circuitry, the timing offset may be biased in one direction. For example, the control unit may be configured to cause the timing offset to slowly decrease over time such that slabs are folded earlier over time (i.e., the reversing of auxiliary stacking conveyor 206 could occur sooner over time). This would cause the slabs to become misaligned in the manner depicted in FIG. 9C (i.e., with the bottom portion overlapping). This biasing could also be used in non-folding embodiments but is not necessary given the ability to detect a three-step transition whenever misalignment occurs.

Feedback from sensor 208 could be employed to ensure that the amount of misalignment remains within reasonable limits. In other words, the timing of the operation of auxiliary stacking conveyor 206 can include a built-in bias towards early folding of a slab to ensure that the bottom portion is slightly overlapping, or in other words, to ensure that sensor 208 will be able to detect both the top and bottom edges of the folded slab. Feedback from sensor 208 can then be used to periodically correct for the bias (e.g., by increasing the timing offset by a suitable amount if the overlap grows too large).

As stated above, this biasing technique could also be employed in non-folding embodiments. One benefit of employing this approach in a non-folding embodiment is that it can minimize the number of sensors and/or the complexity of the timing algorithm. In particular, the bias can ensure that there is always a detectable amount of misalignment at the trailing edges (e.g., that $t_3-t_2 \neq 0$) and therefore, the control unit does not need to be configured to detect whether misalignment on the leading edge is occurring (i.e., the control unit will always know that the top slab is not being dropped too late and only needs to ensure that the misalignment on the trailing edges does not grow too big). This same technique could be used to ensure that misalignment always exist on the leading edge in non-folding embodiments. In other words, the built-in bias could cause the timing offset to slowly increase over time.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. A sod harvester comprising:
   a cutting head for cutting slabs of sod from the ground;
   a stacking conveyor;
   a stacking head positionable overtop the stacking conveyor;
   a first inclined conveyor for receiving the slabs from the cutting head;
   a second conveyor positioned between the first inclined conveyor and the stacking conveyor; and
   an auxiliary stacking conveyor positioned overtop the second conveyor, the auxiliary stacking conveyor being configured to form stacks of slabs on the second conveyor prior to the stacks of slabs being advanced to the stacking conveyor by advancing a first slab from the first inclined conveyor onto the auxiliary stacking conveyor and then advancing the first slab off the auxiliary stacking conveyor onto a second slab as the second slab is advanced along the second conveyor in the same direction as the first slab, the stacking head being configured to remove the stacks of slabs from the stacking conveyor, wherein the stacks of slabs are formed on the second conveyor by performing one of:
   pivoting the first inclined conveyor to advance the first slab onto the auxiliary stacking conveyor and to advance the second slab onto the second conveyor;
   pivoting the second conveyor and the auxiliary stacking conveyor to cause the first slab to be advanced onto the auxiliary stacking conveyor and to cause the second slab to be advanced onto the second conveyor; or
   employing a gate that is positioned between the first inclined conveyor and the second conveyor, the gate being configured to pivot to cause the first slab to be advanced onto the auxiliary stacking conveyor and to cause the second slab to be advanced onto the second conveyor.

2. The sod harvester of claim 1, further comprising:
one or more sensors positioned prior to the auxiliary stacking conveyor, the one or more sensors configured to generate one or more signals when an edge of the slabs of sod is detected.

3. The sod harvester of claim 2, further comprising:
a control unit for controlling the auxiliary stacking conveyor based on the one or more signals received from the one or more sensors.

4. The sod harvester of claim 3, wherein the control unit is configured to modify a timing of operation of the auxiliary stacking conveyor when misalignment is identified.

5. The sod harvester of claim 4, wherein modifying the timing of operation of the auxiliary stacking conveyor comprises modifying a timing offset.

6. The sod harvester of claim 5, wherein the timing offset is biased.

7. The sod harvester of claim 1, wherein the second conveyor is inclined.

8. A sod harvester comprising:
a cutting head for cutting slabs of sod from the ground;
a stacking conveyor;
a stacking head positionable overtop the stacking conveyor;
a set of one or more conveyors for advancing the slabs of sod from the cutting head to the stacking conveyor;
an auxiliary stacking conveyor positioned overtop the set of one or more conveyors; and
an auxiliary stacking head configured to selectively remove the slabs from the set of one or more conveyors and place the slabs on the auxiliary stacking conveyor;
wherein the auxiliary stacking conveyor is configured to form stacks of slabs on the set of one or more conveyors prior to the stacks of slabs being advanced to the stacking conveyor, the stacking head being configured to remove the stacks of slabs from the stacking conveyor.

9. The sod harvester of claim 8, wherein the auxiliary stacking conveyor is configured to form stacks of slabs in a grass-to-grass orientation by advancing a first slab, that is placed on the auxiliary stacking conveyor by the auxiliary stacking head, off of the auxiliary stacking conveyor while inverting the first slab such that the first slab is placed on top of a second slab as the second slab advances along the set of one or more conveyors.

10. The sod harvester of claim 9, wherein the auxiliary stacking conveyor advances the first slab by rotating in a direction that is opposite a direction of rotation of the set of one or more conveyors.

11. The sod harvester of claim 9, further comprising:
one or more inverting guides that are positioned alongside the auxiliary stacking conveyor to guide the inversion of the first slab.

12. The sod harvester of claim 8, wherein the set of one or more conveyors includes a first inclined conveyor for receiving the slabs from the cutting head and a second conveyor positioned between the first inclined conveyor and the stacking conveyor.

13. The sod harvester of claim 12, wherein the second conveyor is inclined.

14. The sod harvester of claim 8, wherein the set of one or more conveyors includes a single inclined conveyor.

15. A method for harvesting sod, the method comprising:
cutting slabs of sod from the ground;
advancing the slabs along a first inclined conveyor that carry the slabs from the ground towards a second conveyor that is positioned between the first inclined conveyor and a stacking conveyor;
selectively diverting some of the slabs onto an auxiliary stacking conveyor that is positioned overtop the second conveyor, selectively diverting comprising one of:
pivoting the first inclined conveyor;
pivoting the second conveyor and the auxiliary stacking conveyor;
pivoting a gate that is positioned between the first inclined conveyor and the second conveyor; or
using a stacking head to pick up the diverted slabs and place the diverted slabs on the auxiliary stacking conveyor;
for each diverted slab, advancing the diverted slab off the auxiliary stacking conveyor and onto one of the slabs that was not diverted and that is being advanced along the second conveyor to thereby form a stack of slabs on the second conveyor;
advancing each stack of slabs from the second conveyor onto the stacking conveyor; and
removing the stacks of slabs from the stacking conveyor.

16. The method of claim 15, further comprising:
modifying a timing of operation of the auxiliary stacking conveyor upon detecting that one or more stacks of slabs are misaligned on the second conveyor.

17. The method of claim 16, wherein the misalignment is detected based on one or more signals received from one or more sensors that detect edges of the slabs.

18. The method of claim 16, wherein modifying the timing of operation comprises adjusting a timing offset.

19. The method of claim 18, wherein the timing offset is biased.

20. The method of claim 15, wherein the second conveyor is not stopped while each diverted slab is advanced onto one of the slabs that was not diverted.

* * * * *